US012747999B2

(12) United States Patent
Cousin et al.

(10) Patent No.: US 12,747,999 B2
(45) Date of Patent: Sep. 29, 2026

(54) MULTI-RESPONSE SINGLE LAYER SENSOR PLATFORM

(71) Applicant: Temptime Corporation, Morris Plains, NJ (US)

(72) Inventors: Ashley M. Cousin, Chatham, NJ (US); Eric W. Liberato, Pequannock, NJ (US); Marielle K. Smith, Parlin, NJ (US); Mohannad Abdo, Clifton, NJ (US)

(73) Assignee: Zebra Technologies Corporation, Lincolnshire, IL (US)

(*) Notice: Subject to any disclaimer, the term of this patent is extended or adjusted under 35 U.S.C. 154(b) by 519 days.

(21) Appl. No.: 18/111,994

(22) Filed: Feb. 21, 2023

(65) Prior Publication Data

US 2024/0280417 A1 Aug. 22, 2024

(51) Int. Cl.
*G01K 11/16* (2021.01)

(52) U.S. Cl.
CPC .................................... *G01K 11/16* (2013.01)

(58) Field of Classification Search
CPC ........... G01K 11/16; G01K 3/04; G01K 11/12
See application file for complete search history.

(56) References Cited

U.S. PATENT DOCUMENTS 8,128,872 B2 3/2012 Lentz et al.
8,430,053 B2 4/2013 Taylor et al.
9,297,706 B2 3/2016 Smith et al.
9,841,381 B2 12/2017 Selvaganapathy et al.
10,031,086 B2 7/2018 Prusik et al.
10,677,660 B2 6/2020 Yuasa et al.
11,131,656 B2 9/2021 Prusik et al.
11,397,115 B2 7/2022 Tsubouchi et al.
11,426,974 B2 8/2022 Abdo et al.
11,435,293 B2 9/2022 Prusik et al.
11,435,294 B2 9/2022 Abdo et al.
11,455,483 B2 9/2022 Prusik et al.
11,579,128 B2 2/2023 Abdo et al.
11,615,280 B2 3/2023 Smith et al.
(Continued)

FOREIGN PATENT DOCUMENTS

WO WO-2020205910 A1 * 10/2020 ............... C09K 9/02

OTHER PUBLICATIONS

International Search Report and Written Opinion dated Jul. 19, 2024 issued for International PCT Patent Application No. PCT/US24/16680.

(Continued)

*Primary Examiner* — Peter J Macchiarolo
*Assistant Examiner* — Mireille S Sadate-Moualeu

(57) ABSTRACT

An apparatus, system, and method for producing a temperature exposure indicator is disclosed. The temperature exposure indicator includes a substrate and a mixture containing a first thermochromic material and a second thermochromic material. Each thermochromic material has an initial color state when the mixture is in a base temperature range and each thermochromic material is configured to change to an excursion color state at a certain temperature threshold. As a result, the mixture displays a low mixture excursion color state below a low temperature threshold and a high mixture excursion color state above a high temperature threshold.

22 Claims, 8 Drawing Sheets

(56) References Cited

U.S. PATENT DOCUMENTS

| | | | |
|---|---|---|---|
| 11,734,539 B2 | 8/2023 | Nudel et al. | |
| 11,738,587 B2 | 8/2023 | Smith et al. | |
| 2008/0110391 A1* | 5/2008 | Taylor | G01K 3/04 374/E11.006 |
| 2011/0248224 A1 | 10/2011 | Lucht et al. | |
| 2012/0154349 A1 | 6/2012 | Daniel et al. | |
| 2012/0162339 A1 | 6/2012 | Ishii et al. | |
| 2013/0068155 A1 | 3/2013 | Patel | |
| 2014/0044609 A1 | 2/2014 | Prusik et al. | |
| 2015/0047552 A1* | 2/2015 | Ortais | C09D 5/26 116/216 |
| 2015/0368487 A1 | 12/2015 | Lane et al. | |
| 2017/0363479 A1 | 12/2017 | Harvey | |
| 2018/0321159 A1 | 11/2018 | Prusik et al. | |
| 2019/0346415 A1 | 11/2019 | Abdo et al. | |
| 2019/0382585 A1* | 12/2019 | Debrauwer | C09B 67/0097 |
| 2019/0383649 A1 | 12/2019 | Abdo et al. | |
| 2020/0003631 A1 | 1/2020 | Sambongi et al. | |
| 2020/0309607 A1* | 10/2020 | Small | C09D 11/50 |
| 2020/0370966 A1 | 11/2020 | Nemet et al. | |
| 2021/0034831 A1 | 2/2021 | Abdo et al. | |
| 2021/0396601 A1 | 12/2021 | Abdo et al. | |
| 2022/0057274 A1* | 2/2022 | Cho | A61B 5/01 |
| 2022/0080763 A1 | 3/2022 | Smith et al. | |
| 2022/0112391 A1* | 4/2022 | Smith | G09F 3/0297 |
| 2022/0178761 A1 | 6/2022 | Huffman et al. | |
| 2022/0244108 A1 | 8/2022 | Abdo et al. | |
| 2022/0252464 A1 | 8/2022 | Huffman et al. | |
| 2022/0268640 A1 | 8/2022 | Bhatia et al. | |
| 2022/0283041 A1 | 9/2022 | Olson et al. | |
| 2022/0318583 A1 | 10/2022 | Nudel et al. | |
| 2022/0412933 A1 | 12/2022 | Millman et al. | |
| 2023/0114227 A1 | 4/2023 | Hofer et al. | |
| 2023/0126486 A1 | 4/2023 | Smith et al. | |

OTHER PUBLICATIONS

International Search Report dated Jan. 24, 2023 issued for International PCT Application No. PCT/US22/45855.

* cited by examiner

MULTI-RESPONSE SINGLE LAYER SENSOR PLATFORM

BACKGROUND

Many types of products are perishable under different environmental conditions. For example, products may be degraded or rendered unsafe or otherwise unusable by too much heat exposure cumulatively over time or peak heat exposure over a threshold that rapidly causes product deterioration, such as denaturing the proteins of a biologic product or thawing of a frozen product. Other products may be negatively impacted by being too cold, e.g., by freezing or other undesirable physical changes caused by too low a temperature. Many types of indicators are used to show historical exposure to environmental conditions, e.g., too low or too high a temperature, often in a visible manner, such as by change of color of an indicator material.

Certain types of thermochromic materials, often referred to as memory thermochromic materials, exhibit semi-irreversible color changes in response to changing temperature. These materials exhibit a color changing hysteresis effect, changing to a high temperature color state when heated above a high temperature threshold, with the high temperature color state being maintained when the material returns to a temperature below the high temperature threshold. The material then changes to a low temperature color state only when the temperature reduces even further, below a low temperature threshold. The material then remains in the low temperature color state until the material returns to a temperature above the high temperature threshold. For example the material may be light colored in the low temperature state and dark colored in the high temperature state, or vice versa, or the material may be transparent or invisible in the high temperature state, and colored or visible in the low temperature state, or vice versa.

Likewise, other types of thermochromic materials exhibit semi-irreversible color changes in response to changing temperature. These materials also exhibit a color changing hysteresis effect, changing to a high temperature color state when heated above a high temperature threshold, with the color state being maintained when the material returns to a temperature below that threshold or changing to a low temperature color state when cooled below a low temperature threshold, with the color state being maintained when the material returns to a temperature above that threshold.

Yet other materials can act similarly in response to other environmental stimuli such as exposure to particular substances, exposure to a predetermined amount of radiation, or exposure to a predetermined humidity level.

SUMMARY

Example apparatus are disclosed herein for a temperature exposure indicator including a substrate and a mixture containing a first thermochromic material and a second thermochromic material; and a temperature exposure indicator mixture. Also disclosed is an article of manufacture including a package with a temperature exposure indicator. Additionally, methods for producing a temperature exposure indicator are disclosed.

In light of the disclosure herein and without limiting the disclosure in any way, in a first aspect of the present disclosure, which may be combined with any other aspect listed herein unless specified otherwise, a temperature exposure indicator comprises a substrate and a mixture of a first thermochromic material and a second thermochromic material supported by the substrate. The first thermochromic material has a first initial color state while in a base temperature range and is configured to change to a low excursion color state below a low temperature threshold. The second thermochromic material has a second initial color state while in the base temperature range and is configured to change to a high excursion color state above a high temperature threshold. The mixture is configured to have a base mixture color state in the base temperature range, a low mixture excursion color state below the low temperature threshold, and a high mixture excursion color state above the high temperature threshold.

In another aspect of the present disclosure, which may be used in combination with any other aspect or combination of aspects listed herein, the first initial color state and the second initial color state are colorless, white, or transparent, and the low excursion color state and high excursion color state are colored, dark, or opaque.

In another aspect of the present disclosure, which may be used in combination with any other aspect or combination of aspects listed herein, the base mixture color state is colorless, white, or transparent, and the low mixture excursion color state and high mixture excursion color state are colored, dark, or opaque.

In another aspect of the present disclosure, which may be used in combination with any other aspect or combination of aspects listed herein, the first initial color state and the second initial color state are colored, dark, or opaque, and the low excursion color state and high excursion color state are colorless, white, or transparent.

In another aspect of the present disclosure, which may be used in combination with any other aspect or combination of aspects listed herein, the base mixture color state is colored, dark, or opaque and the low mixture excursion color state and high mixture excursion color state are colorless, white, or transparent.

In another aspect of the present disclosure, which may be used in combination with any other aspect or combination of aspects listed herein, the first thermochromic material is configured, after being in the low excursion color state below the low temperature threshold, to return to the first initial color state when the first thermochromic material warms above the low temperature threshold.

In another aspect of the present disclosure, which may be used in combination with any other aspect or combination of aspects listed herein, the second thermochromic material is configured, after being in the high excursion color state above the high temperature threshold, to return from the high excursion color state to the second initial color state when the second thermochromic material cools below the high temperature threshold.

In another aspect of the present disclosure, which may be used in combination with any other aspect or combination of aspects listed herein, the mixture is configured, after being in the low mixture excursion color state below the low temperature threshold, to return to the base mixture color state when the mixture warms above the low temperature threshold.

In another aspect of the present disclosure, which may be used in combination with any other aspect or combination of aspects listed herein, the mixture is configured, after being in the high mixture excursion color state above the high temperature threshold, to return from the high mixture excursion color state to the base mixture color state when the mixture cools below the high temperature threshold.

In another aspect of the present disclosure, which may be used in combination with any other aspect or combination of aspects listed herein, the first thermochromic material, after being in the low excursion color state below the low temperature threshold, is configured to remain in the low excursion color state when the first thermochromic material warms above the low temperature threshold.

In another aspect of the present disclosure, which may be used in combination with any other aspect or combination of aspects listed herein, the second thermochromic material after being in the high excursion color state above the high temperature threshold, is configured to remain in the high excursion color state when the second thermochromic material cools below the high temperature threshold.

In another aspect of the present disclosure, which may be used in combination with any other aspect or combination of aspects listed herein, the low excursion color state is not visually distinguishable from the low mixture excursion color state.

In another aspect of the present disclosure, which may be used in combination with any other aspect or combination of aspects listed herein, the high excursion color state is not visually distinguishable from the high mixture excursion color state.

In another aspect of the present disclosure, which may be used in combination with any other aspect or combination of aspects listed herein, the low excursion color state is visually distinguishable from the low mixture excursion color state.

In another aspect of the present disclosure, which may be used in combination with any other aspect or combination of aspects listed herein, the high excursion color state is visually distinguishable from the high mixture excursion color state.

In another aspect of the present disclosure, which may be used in combination with any other aspect or combination of aspects listed herein, the temperature exposure indicator further comprises a first color reference colored in a first reference color within the low mixture excursion color state and a second color reference colored in a second reference color within the high mixture excursion color state.

In another aspect of the present disclosure, which may be used in combination with any other aspect or combination of aspects listed herein, the mixture, having had temperature excursions both below the low temperature threshold and above the high temperature threshold is configured to have a third mixture excursion color state visibly distinguishable from the base mixture color state, the low mixture excursion color state, and the high mixture excursion color state.

In another aspect of the present disclosure, which may be used in combination with any other aspect or combination of aspects listed herein, the temperature exposure indicator further comprises a first color reference colored in a first reference color within the low mixture excursion color state, a second color reference colored in a second reference color within the high mixture excursion color state, and a third color reference colored in a third reference color within the third mixture excursion color state.

In another aspect of the present disclosure, which may be used in combination with any other aspect or combination of aspects listed herein, the mixture further comprises a rheology modifier, a de-foamer, and a resin.

In another aspect of the present disclosure, which may be used in combination with any other aspect or combination of aspects listed herein, the mixture is applied to the substrate as a component of an ink.

In another aspect of the present disclosure, which may be used in combination with any other aspect or combination of aspects listed herein, the ink is a flexographic ink.

In another aspect of the present disclosure, which may be used in combination with any other aspect or combination of aspects listed herein, the ink is a screen printing ink.

In another aspect of the present disclosure, which may be used in combination with any other aspect or combination of aspects listed herein, the ink is a gravure ink.

In another aspect of the present disclosure, which may be used in combination with any other aspect or combination of aspects listed herein, the ink is a rotary ink.

In another aspect of the present disclosure, which may be used in combination with any other aspect or combination of aspects listed herein, the ink is a digital ink.

Aspects of the subject matter described herein may be useful alone or in combination with one or more other aspects described herein. In another aspect of the present disclosure, which may be used in combination with any other aspect or combination of aspects listed herein, a thermochromic ink comprises a first thermochromic material, a second thermochromic material, a rheology modifier, a de-foamer, a resin, and water.

In another aspect of the present disclosure, which may be used in combination with any other aspect or combination of aspects listed herein, the first thermochromic material is between 10% and 20% of a total weight of the thermochromic ink.

In another aspect of the present disclosure, which may be used in combination with any other aspect or combination of aspects listed herein, the second thermochromic material is between 10% and 20% of a total weight of the thermochromic ink.

In another aspect of the present disclosure, which may be used in combination with any other aspect or combination of aspects listed herein, the rheology modifier is between 0% and 2% of a total weight of the thermochromic ink.

In another aspect of the present disclosure, which may be used in combination with any other aspect or combination of aspects listed herein, the de-foamer is between 0% and 2% of a total weight of the thermochromic ink.

In another aspect of the present disclosure, which may be used in combination with any other aspect or combination of aspects listed herein, the water is between 40% and 60% of a total weight of the thermochromic ink.

In another aspect of the present disclosure, which may be used in combination with any other aspect or combination of aspects listed herein, the resin is between 15% and 25% of a total weight of the thermochromic ink.

In another aspect of the present disclosure, which may be used in combination with any other aspect or combination of aspects listed herein, the first thermochromic material has a first initial color state while in a base temperature range and configured to change to a low excursion color state below a low temperature threshold.

In another aspect of the present disclosure, which may be used in combination with any other aspect or combination of aspects listed herein, the second thermochromic material has a second initial color state while in the base temperature range and configured to change to a high excursion color state above a high temperature threshold.

In another aspect of the present disclosure, which may be used in combination with any other aspect or combination of aspects listed herein, the thermochromic ink is configured to have a base mixture color state in the base temperature range, a low mixture excursion color state below the low temperature threshold, and a high mixture excursion color state above the high temperature threshold.

In another aspect of the present disclosure, which may be used in combination with any other aspect or combination of aspects listed herein, the rheology modifier is selected from a list consisting of Cellosize QP 4400H, Acrysol RM-8, Acrysol RM-8W, Acrysol RM-242, Additol VXW 6460, or Tego Viscoplus 3060.

In another aspect of the present disclosure, which may be used in combination with any other aspect or combination of aspects listed herein, the de-foamer is selected from a list consisting of Additol XW 6569, Additol WT 102 DF-M, Surfynol DF-58, Airase 5655, Tego Foamex 9, Tego Foamex 852, Tego Foamex 1488, Tego Airex 922.

In another aspect of the present disclosure, which may be used in combination with any other aspect or combination of aspects listed herein, the resin is an acrylic polymer, polyvinyl alcohol, polyacrylate, styrene acrylic copolymer, vinyl resin, acrylic resin, polyurethane, alkyd resin, epoxy resin, hydrocarbon wax, carnauba wax, or candelilla wax.

Aspects of the subject matter described herein may be useful alone or in combination with one or more other aspects described herein. In another aspect of the present disclosure, which may be used in combination with any other aspect or combination of aspects listed herein, an article of manufacture comprises a package and a temperature exposure indicator on or in the package. The temperature exposure indicator has a mixture of a first thermochromic material and a second thermochromic material. The first thermochromic material having a first initial color state while in a base temperature range and is configured to change to a low excursion color state below a low temperature threshold. The second thermochromic material having a second initial color state while in the base temperature range and is configured to change to a high excursion color state above a high temperature threshold. The mixture is configured to have a base mixture color state in the base temperature range, a low mixture excursion color state below the low temperature threshold, and a high mixture excursion color state above the high temperature threshold.

In another aspect of the present disclosure, which may be used in combination with any other aspect or combination of aspects listed herein, the package contains a perishable host product.

In another aspect of the present disclosure, which may be used in combination with any other aspect or combination of aspects listed herein, the perishable host product has a predetermined specified exposure limit for a predetermined temperature threshold.

In another aspect of the present disclosure, which may be used in combination with any other aspect or combination of aspects listed herein, the temperature exposure indicator is configured so that the mixture transitions from the base mixture color state to the low mixture excursion color state when exposed to the predetermined temperature threshold beyond the predetermined specified exposure limit.

In another aspect of the present disclosure, which may be used in combination with any other aspect or combination of aspects listed herein, the temperature exposure indicator is configured so that the mixture transitions from the base mixture color state to the high mixture excursion color state when exposed to the predetermined temperature threshold beyond the predetermined specified exposure limit.

In another aspect of the present disclosure, which may be used in combination with any other aspect or combination of aspects listed herein, the first initial color state and the second initial color state are colorless, white, or transparent, and the low excursion color state and high excursion color state are colored, dark, or opaque.

In another aspect of the present disclosure, which may be used in combination with any other aspect or combination of aspects listed herein, the base mixture color state is colorless, white, or transparent, and the low mixture excursion color state and high mixture excursion color state are colored, dark, or opaque.

In another aspect of the present disclosure, which may be used in combination with any other aspect or combination of aspects listed herein, the first initial color state and the second initial color state are colored, dark, or opaque, and the low excursion color state and high excursion color state are colorless, white, or transparent.

In another aspect of the present disclosure, which may be used in combination with any other aspect or combination of aspects listed herein, the base mixture color state is colored, dark, or opaque and the low mixture excursion color state and high mixture excursion color state are colorless, white, or transparent.

In another aspect of the present disclosure, which may be used in combination with any other aspect or combination of aspects listed herein, the first thermochromic material is configured, after being in the low excursion color state below the low temperature threshold, to return to the first initial color state when the first thermochromic material warms above the low temperature threshold.

In another aspect of the present disclosure, which may be used in combination with any other aspect or combination of aspects listed herein, the second thermochromic material is configured, after being in the high excursion color state above the high temperature threshold, to return from the high excursion color state to the second initial color state when the second thermochromic material cools below the high temperature threshold.

In another aspect of the present disclosure, which may be used in combination with any other aspect or combination of aspects listed herein, the mixture is configured, after being in the low mixture excursion color state below the low temperature threshold, to return to the base mixture color state when the mixture warms above the low temperature threshold.

In another aspect of the present disclosure, which may be used in combination with any other aspect or combination of aspects listed herein, the mixture is configured, after being in the high mixture excursion color state above the high temperature threshold, to return from the high mixture excursion color state to the base mixture color state when the mixture cools below the high temperature threshold.

In another aspect of the present disclosure, which may be used in combination with any other aspect or combination of aspects listed herein, the first thermochromic material, after being in the low excursion color state below the low temperature threshold, is configured to remain in the low excursion color state when the first thermochromic material warms above the low temperature threshold.

In another aspect of the present disclosure, which may be used in combination with any other aspect or combination of aspects listed herein, the second thermochromic material after being in the high excursion color state above the high temperature threshold, is configured to remain in the high excursion color state when the second thermochromic material cools below the high temperature threshold.

In another aspect of the present disclosure, which may be used in combination with any other aspect or combination of aspects listed herein, the low excursion color state is not visually distinguishable from the low mixture excursion color state.

In another aspect of the present disclosure, which may be used in combination with any other aspect or combination of aspects listed herein, the high excursion color state is not visually distinguishable from the high mixture excursion color state.

In another aspect of the present disclosure, which may be used in combination with any other aspect or combination of aspects listed herein, the low excursion color state is visually distinguishable from the low mixture excursion color state.

In another aspect of the present disclosure, which may be used in combination with any other aspect or combination of aspects listed herein, the high excursion color state is visually distinguishable from the high mixture excursion color state.

In another aspect of the present disclosure, which may be used in combination with any other aspect or combination of aspects listed herein, the article of manufacture further comprises a first color reference colored in a first reference color within the low mixture excursion color state and a second color reference colored in a second reference color within the high mixture excursion color state.

In another aspect of the present disclosure, which may be used in combination with any other aspect or combination of aspects listed herein, the mixture, having had temperature excursions both below the low temperature threshold and above the high temperature threshold is configured to have a third mixture excursion color state visibly distinguishable from the base mixture color state, the low mixture excursion color state, and the high mixture excursion color state.

In another aspect of the present disclosure, which may be used in combination with any other aspect or combination of aspects listed herein, the article of manufacture further comprises a first color reference colored in a first reference color within the low mixture excursion color state, a second color reference colored in a second reference color within the high mixture excursion color state, and a third color reference colored in a third reference color within the third mixture excursion color state.

In another aspect of the present disclosure, which may be used in combination with any other aspect or combination of aspects listed herein, the mixture further comprises a rheology modifier, a de-foamer, and a resin.

In another aspect of the present disclosure, which may be used in combination with any other aspect or combination of aspects listed herein, the mixture is applied to a substrate as a component of an ink.

In another aspect of the present disclosure, which may be used in combination with any other aspect or combination of aspects listed herein, the ink is a flexographic ink.

In another aspect of the present disclosure, which may be used in combination with any other aspect or combination of aspects listed herein, the ink is a screen printing ink.

In another aspect of the present disclosure, which may be used in combination with any other aspect or combination of aspects listed herein, the ink is a gravure ink.

In another aspect of the present disclosure, which may be used in combination with any other aspect or combination of aspects listed herein, the ink is a rotary ink.

In another aspect of the present disclosure, which may be used in combination with any other aspect or combination of aspects listed herein, the ink is a digital ink.

Aspects of the subject matter described herein may be useful alone or in combination with one or more other aspects described herein. In another aspect of the present disclosure, which may be used in combination with any other aspect or combination of aspects listed herein, a method of producing a temperature exposure indicator comprises mixing components including a first thermochromic material and a second thermochromic material to create a mixture and applying the mixture to a substrate.

In another aspect of the present disclosure, which may be used in combination with any other aspect or combination of aspects listed herein, the first thermochromic material is in a first initial color state.

In another aspect of the present disclosure, which may be used in combination with any other aspect or combination of aspects listed herein, the second thermochromic material is in a second initial color state.

In another aspect of the present disclosure, which may be used in combination with any other aspect or combination of aspects listed herein, the mixture is in a base mixture color state.

In another aspect of the present disclosure, which may be used in combination with any other aspect or combination of aspects listed herein, the method of producing a temperature exposure indicator further comprises the steps of treating the first thermochromic material to display a first initial color state.

In another aspect of the present disclosure, which may be used in combination with any other aspect or combination of aspects listed herein, the method of producing a temperature exposure indicator further comprises the steps of treating the second thermochromic material to display a first initial color state.

In another aspect of the present disclosure, which may be used in combination with any other aspect or combination of aspects listed herein, the mixture further includes a rheology modifier, a de-foamer, a resin, and water.

In another aspect of the present disclosure, which may be used in combination with any other aspect or combination of aspects listed herein, the method of producing a temperature exposure indicator further comprises the steps of performing a thermal print operation on a thermal transfer ribbon to print the mixture, thereby creating the temperature exposure indicator, the thermal transfer ribbon including a release layer coated in an ink.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
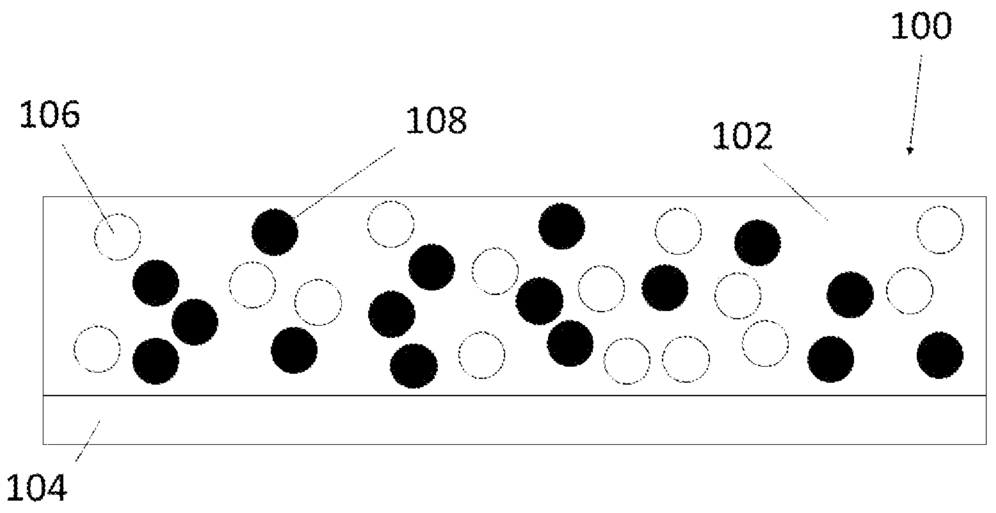
FIG. 1 illustrates a side view of a mixture on a substrate displaying a first thermochromic material and a second thermochromic material within the mixture.

Thermochromic pigments, usually applied in the form of thermochromic inks, are commonly used in temperature exposure indicators. Usually the thermochromic pigment responds to a temperature excursion or exposure beyond a predetermined temperature by changing color state. This change may be permanent, or may be transient (changing quickly to the original state if the temperature returns below the threshold (or above the threshold for a low temperature threshold), or semi-irreversible, exhibit a hysteresis effect, where passing below the threshold (or above for a low temperature threshold) does not change the color state, but passing through a lower "reset" threshold (or higher for a low temperature threshold) does. Generally commercially available thermochromic inks are not mixed, and manufacturers of such inks often expressly recommend avoiding mixing them. Simply mixing inks will tend to interfere with proper temperature indication, or be difficult to print. This is particularly the case when the different types of inks behave in different ways—for example having different types of color changes, or changes that occur in different directions rather than being simply additive. Moreover, to make an ink with multiple thermochromic materials in the same ink may present difficult formulation challenges, for example because of the need for much higher pigment loadings to overcome the effect of having different inks with different color changing properties mixed, but still displaying the individual color changes in a recognizable manner.

Commercialized thermochomic pigments in the prior art can only display one environmental profile related to one environmental stimulus, although a single thermochromic pigment may have multiple color states as it transitions from an initial color state to an end color state. As a result, users that desire multiple data points related to environmental stimuli, such as temperature exposure or humidity exposure, or both high and low temperature excursion indication, must affix multiple temperature exposure indicators to an article to be monitored. It can be costly and complicated to create and adhere multiple temperature exposure indicators to an article. Sometimes, more importantly, it may be difficult for users to read and interpret multiple temperature exposure indicators quickly and accurately. A device with multiple separate indicators is harder to read, and requires more training to reliability interpret.

The apparatus, systems, methods, and techniques described herein generally concern a temperature exposure indicator containing a mixture of a first thermochromic material and a second thermochromic material that can display responses to multiple different environmental stimuli in the same region or area of the device.

A multi-response temperature exposure indicator thus solves the problem of needing multiple formulations and indicators, each of which respond to a single, binary environmental stimulus. In addition, the disclosed temperature exposure indicator streamlines the manufacturing process by eliminating the need to print separate temperature exposure indicators in a single area, such as on a label. The temperature exposure indicator may also be easier for users to read and interpret.

As used herein, the term "low temperature threshold" means a temperature, below which a temperature exposure indicator changes color state. A low temperature excursion is exposure of the indicator to temperatures below the low temperature threshold, possibly for a short time, or possibly for some minimum amount of time. In some instances, the indicator may be selected or configured so that this threshold corresponds to a temperature below which a product quality may be impaired (e.g., freezing, crystallization, or reduced efficacy of the product), or a temperature corresponding to a boundary of a permitted specified exposure temperature range permitted for handling the product. The threshold temperature may vary depending on the properties of the host product which is being monitored. The predetermined threshold may not exactly correspond to the temperature where the product is affected, e.g., a freeze indicator is usually configured to change color state at a temperature slightly above the actual freezing point of the product, to ensure that it more reliably records all events that would affect the product.

As used herein, the term "high temperature threshold" means a predetermined temperature, above which a temperature exposure indicator changes color state. A high temperature excursion is exposure of the indicator to temperatures above the high temperature threshold, possibly for a short time, or possibly for some minimum amount of time. The high temperature threshold may vary depending on the nature of the indicator, and the degradation mechanism that is being monitored. In some cases the high temperature threshold may be higher than normal ambient conditions, e.g., around 100 degrees C., or even higher. In some instances, this may correspond to a temperature above which a product quality may be impaired (e.g., spoilage or reduced efficacy of the product), or a temperatures corresponding to the boundary of a permitted specified exposure temperature range permitted for handling the product. For example, the mechanism of concern may include thawing (temperatures above a threshold of about 0° C., although varying with the nature of the host product and/or the melting point of one of its components), failing to maintain proper refrigeration (temperatures above a threshold in the range of about 6° C.-15° C., depending on the product and/or refrigeration/storage protocol, or the product being allowed to overwarm in hot ambient conditions (temperatures thresholds from about 35° C. to about 60° C. It will be appreciated that other thresholds and ranges can be chosen as appropriate for a particular product to be monitored.

FIG. 1 illustrates the side view of a temperature exposure indicator 100 including a mixture 102 affixed atop a substrate 104. The substrate 104 may be any material suitable for receiving and displaying the mixture 102, e.g., porous materials for bar codes printed using inks, etchable materials for laser-etched bar codes, paper, nylon, vinyl, other synthetic polymers such as polytetrafluoroethylene ("PTFE"), or other materials that are suitable for receiving and displaying the mixture 102. The substrate 104 may, for example, be paper or film (e.g., nylon, vinyl, synthetic polymer material, carbon fiber, Teslin synthetic paper, polyethylene ("PE"), polypropylene ("PP"), polytetrafluoroethylene ("PTFE"), polyester, polyethylene, polyolefin, polyimide, vinyl, acrylic film, polypropylene, non-woven nylon, coated and non-coated direct thermal paper, printable polyethylene terephthalate ("PET"), oriented polypropylene ("OPP"), biaxially oriented polypropylene ("BOPP"). The substrate 104 may be or may not be part of a package or label for perishable host product as described below. In an example, the substrate 104 may be a thermal transfer ribbon. In other embodiments, the mixture 102 is encapsulated by the substrate 104 to protect the mixture 102 from external damage.

The mixture 102 may be affixed to the substrate by directly printing the mixture 102 onto the substrate 104. Printing methods are discussed in more detail below. It will be appreciated that in other embodiments, other methods of adhering the mixture 102 to the substrate 104 may be employed.

The mixture 102 is comprised of at least a first thermochromic material 106 and a second thermochromic material 108. A thermochromic material is a composition or combination of compositions that possess the property of changing color state in response to a change in temperature. Due to the color-changing properties of thermochromic materials, the first thermochromic material 106, the second thermochromic material 108, and the mixture 102 exhibit various color states. As used herein, the term "color state" refers to an observable color including a change in hue, darkness, color intensity, opacity, fluorescence or phosphorescense, or other observable optical properties of the indicator material. The change in color state may be detectable by the unaided human eye, or may occur in a manner that requires machine detection, e.g., at wavelengths not visible to the unaided human eye, or in some cases only in response to being interrogated by a particular reader emitting particular light wavelengths, such as UV or IR.

In the present disclosure, temperature exposure indicators 100 for historical temperature exposure may be provided using semi-irreversible thermochromic compositions, which are also called memory thermochromics. The memory thermochromic composition selected may be exhibit hysteresis—the phenomenon in which the value of a physical property lags behind changes in the effect causing it—between one color state to another, e.g., color density, although it will be appreciated that any color state change that is detectable may be employed as described below. These compositions are called memory thermochromics given that they exhibit a large hysteresis curve.

Thermochromic Materials

When a thermochromic material is placed in a state above a high temperature threshold, the thermochromic material enters a high temperature color state, e.g., a dark to light high temperature exposure indicator becoming light. The material then remains light as the temperature is lowered below the threshold, until a low temperature threshold is approached. At this time the material transitions to a low temperature color state, e.g., becoming dark. (It will be appreciated that other color state transitions may also be possible, depending on the material.) The thermochromic material then remains in the low temperature color state, e.g., dark, as the material is heated above the low temperature threshold, until the thermochromic material begins to approach the high temperature threshold. The potential hysteresis of the memory thermochromic composition may be advantageously exploited in condition change indicators, such as ascending and descending indicators. Furthermore, given the potential hysteresis, remaining in a particular color state does not mean necessarily staying exactly the same color given a potential for variability in color density. The hysteresis is what advantageously provides the desired "memory" or "semi-irreversibility" functionality. Color changes are discussed in more detail below.

Color States

The first thermochromic material 106 has a first initial color state. When exposed to a predetermined low temperature threshold, the first thermochromic material 106 changes to a low excursion color state. Likewise, the second thermochromic material 108 has a second initial color state. When the second thermochromic material 108 is exposed to a predetermined high temperature threshold, the second thermochromic material 108 changes to a high excursion color state. When mixed together into a mixture 102, the mixture 102 exhibits the chemical properties of both the first thermochromic material 106 and the second thermochromic material 108. When the mixture 102 is exposed to the predetermined low temperature threshold, the mixture 102 changes to a low mixture excursion color state. When the mixture 102 is exposed to the predetermined high temperature threshold, the mixture 102 changes to a high mixture excursion color state.

When not exposed to either the predetermined low temperature threshold or the predetermined high temperature threshold, the mixture 102 has a base mixture color state in a base temperature range. As used herein, the term "base temperature range" means a temperature range in which the first thermochromic material 106 is in the first initial color state and the second thermochromic material 108 is in the second initial color state. In some embodiments, the base temperature range is the temperature range in which the temperature exposure indicator is routinely kept. The threshold temperature may vary depending on the properties of a host product which is being monitored, or specifications or regulations for handling such products in the logistics chain. This temperature range may be ambient room temperature at approximately 20° C.-25° C. or refrigerator temperature at approximately 8° C.-12° C. In some examples, the base temperature range may be a smaller range, varying only by a few degrees, such as 20° C.-25° C. or 0° C.-5° C.

In other examples, the base temperature range may be larger, varying by tens of degrees, such as 5° C.-60° C. or 0° C.-70° C.

In some examples, the first initial color state and the second initial color state are colorless, white, or transparent, and the low excursion color state and high excursion color state are colored, dark, or opaque. In other examples, the base mixture color state is colorless, white, or transparent, and the low mixture excursion color state and high mixture excursion color state are colored, dark, or opaque. In yet other embodiments, the first initial color state and the second initial color state are colored, dark, or opaque, and the low excursion color state and high excursion color state are colorless, white, or transparent. Additionally, in other examples, the base mixture color state is colored, dark, or opaque and the low mixture excursion color state and high mixture excursion color state are colorless, white, or transparent. It will be appreciated that all color states including the first initial color state, low excursion color state, second initial color state, high excursion color state, base mixture color state, low mixture excursion color state, and high mixture excursion color state, may transition from light to dark, dark to light, transparent to opaque, opaque to transparent, or any other combination thereof. Examples of color state changes are described below.

Further, the chemical or physical state change of the first thermochromic material 106 and second thermochromic material 108 may be a continuous state change, causing a continuous semi-irreversible change in the color state of the first thermochromic material 106 and the second thermochromic material 108 or a reversible color state in the first thermochromic material 106 and second thermochromic material 108 change once a predetermined temperature crosses a predefined threshold such as a predetermined temperature threshold. It will be appreciated that both the first and second thermochromic materials may each be either reversible, irreversible, or semi-irreversible, and that they need not be the same, e.g., one may be irreversible and the other semi-irreversible.

In a semi-irreversible color change of the first thermochromic material 106, used as a low temperature excursion indicator, the material has two color states—a high color state and a low color state. The material exhibits hysteresis behavior as it transitions between those two states. For example, the material might be provided in its high color state (or pretreated with a sufficiently high temperature to ensure it is in its high temperature state). The material remains in this state at ambient or other typical operating temperatures for the material, e.g., around 15 to 25° C. for a material that is held at normal climate controlled room temperature, 27 to 32° C. for a product that is intended to remain warm, or up to 35 or 40° C. (or higher) for a product that can endure some exposure to warmer outdoor temperatures. When the material is exposed to a temperature below a predetermined threshold, it transitions to a low temperature color state. When the material returns to the normal operating temperature it remains in the low temperature state, and only returns to the high temperature state after being exposed to some higher "reset" temperature well above normal operating conditions (e.g., a temperature higher than that achieved at ambient temperature, achieved using, for example, a hot plate or other heating device). Once it is reset to the high temperature state, it remains in that state at normal operating temperature, until exposed to a temperature below the low temperature exposure threshold. In a semi-irreversible color change of the first thermochromic material 108, after being exposed to a first predetermined temperature threshold to bring the first thermochromic material 106 to its first initial color state (e.g. pre-treating the first thermochromic material 106 with exposure to a low temperature such as −10° C.), would transition from its first initial color state to the low excursion color state and would remain in the low excursion color state regardless of the temperature thereafter.

In a semi-irreversible color change of the second thermochromic material 108, used as a high temperature excursion indicator, the material has two color states—a high color state and a low color state. The material exhibits hysteresis behavior as it transitions between those two states. For example, the material might be provided in its low color state (or pretreated with a sufficiently low temperature to ensure it is in its low temperature state). The material remains in this state at ambient or other typical operating temperatures for the material, e.g., around 0° C. for a material that is intended to monitor a product that is to be kept frozen, 6 to 12° C. for a product that is intended to remain refrigerated, or around 15 to 25° C. for a material that is held at normal climate controlled room temperature, or up to 35 or 40° C. (or higher) for a product that can endure some exposure to warmer outdoor temperatures. When the material is exposed to a temperature above a predetermined threshold, it transitions to a high temperature color state. When the material returns to the normal operating temperature it remains in the high temperature state, and only returns to the low temperature state after being exposed to some lower "reset" temperature well below normal operating conditions (e.g., a temperature lower than that achieved in a normal commercial freezer, achieved using, for example, a deep freezer, a cryogenic freeze spray, dry ice, or liquid nitrogen). Once it is reset to the low temperature state, it remains in that state at normal operating temperature, until exposed to a temperature above the high temperature exposure threshold. In a semi-irreversible color change of the second thermochromic material 108, after being exposed to a second predetermined temperature threshold to bring the second thermochromic material 108 to its second initial color state (e.g. pre-treating the second thermochromic material 108 with exposure to a high temperature such as 70° C.), would transition from its second initial color state to the high excursion color state and would remain in the high excursion color state regardless of the temperature thereafter.

In a reversible color change of the first thermochromic material 106, once exposure to the predetermined temperature threshold ceases, the first thermochromic material 106 transitions from the low excursion color state to the first initial color state. In a reversible color change of the second thermochromic material 108, once exposure to the predetermined temperature threshold ceases, the second thermochromic material 108 transitions from the high excursion color state to the low initial color state.

Reversible thermochromic materials may include a variety of materials that undergo a color change at a variety of temperatures. For example, LCR Hallcrest TC pigments and water based inks may be configured to undergo a color change at standard 15° C., 31° C., and 47° C., or may be customized to change color states (e.g. within a range from −10° C. to 69° C.). More reversible thermochromic materials include Atlanta Chemical Engineering TC pigments which may undergo color changes at 5° C., 8° C., 25° C., 31° C., 38° C., or 70° C. Further reversible thermochromic materials include a thermal dust such as Solar Color Dust (configured to undergo a change in color state at 22° C., 25° C., 30° C., 35° C., 37° C., 55° C., 65° C., or 70° C.); Siltech LTD flexo ink TCFBK29 (configured to change to a black color state at 29° C.); Siltech LTD flexo ink TCSRD41 (configured to change to a red color state at 41° C.); Siltech LTD flexo ink TCSGNY35 (configured to change to a green color state at 35° C.); New Color Chemical (NCC) water based slurry and pigment powders (configured to undergo a change in color state within −15° C. to 70° C.); Glo Mania pigment powders (configured to undergo a change in color state at 22° C. or 31° C.); Sandream Impact LLC pigment powders and water based slurry (configured to undergo a change in color state at 18° C., 22° C. or within a range of 29° C. to 40° C.); Glitter Unique pigment powder (configured to undergo a change in color state at 15° C., 18° C., 20° C., 22° C., or 25° C.); Nanomatrix flexo ink (configured to undergo a change in color state within 5° C. to 60° C.); Matsui Color water based ink/slurry and Chromicolor MS pigment powder (configured to undergo a change in color state within 5° C. to 37° C.); United Mineral and Chemical pigment powders (configured to undergo a change in color state within −15° C. to 70° C.); Kolortech Co. LTD pigment powders (configured to undergo a change in color state at 16° C., 17° C., 18° C., 22° C., 30° C., 31° C., 32° C., 41° C., 42° C., or 43° C.); Insilico Chameleon pigment powder and water based slurry (configured to undergo a change in color state within 0° C. to 70° C.); Insilico RTP pigment powders (configured to undergo a change in color state at 35° C., 45° C., or 60° C.); iSuo Chemical pigment powder (configured to undergo a change in color state at 5° C., 10° C., 16° C., 31° C., 33° C., 43° C., 45° C., 50° C., or 60° C.); or Magna Colors Variotherm pigments (configured to undergo a change in color state at 22° C. or 31° C.); or Flint Group water based inks (configured to undergo a change in color state within −10° C. to 65° C.). Reversible thermochromic materials may be configured to exhibit color states in black, blue, violet, dark blue, fast blue, turquoise, green, magenta, orange, red, pink, yellow, brown, purple, transparent, or clear. Several examples of reversible thermochromic materials are described in greater detail below. It will be appreciated that the color states listed above are purely exemplary and other color states may exist.

Semi-irreversible thermochromic materials may include a variety of materials that undergo a color change within a variety of temperature ranges. For example, semi-irreversible thermochromic materials include Matsui Color Thermolock MS pigment powder Type 11 (configured to undergo a change in color state between 15° C. and 63° C.); Matsui Color Thermolock MS pigment powder Type 23 (configured to undergo a change in color state between −30° C. and 80° C.); Matsui Color Thermolock MS pigment powder Type 39 (configured to undergo a change in color state between −40° C. and 10° C.); Matsui Color Thermolock MS pigment powder Type 48 (configured to undergo a change in color state between −35° C. and 22° C.); Matsui Color Thermolock MS pigment powder Type 55 (configured to undergo a change in color state between −25° C. and 37° C.); Matsui Color Thermolock MS pigment powder Type 60 (configured to undergo a change in color state between −15° C. and 49° C.); Matsui Color Thermolock MS pigment powder Type 72 (configured to undergo a change in color state between −35° C. and 55° C.); Matsui Color Thermolock MS pigment powder Type 79 (configured to undergo a change in color state between −60° C. and 72° C.); LCR Hallcrest water-based screen and flexo inks/slurry (configured to undergo a change in color state at various ranges which may include 0° C. to 40° C., 0° C. to 50° C., −20° C. to 70° C., −16° C. to 5° C., −20° C. to 5° C., 3° C. to 12° C., or 15° C. to 31° C.); United Mineral and Chemical water based slurry ink (configured to undergo a change in color state at various ranges which may include 0° C. to 50° C. or 0° C. to 55° C.); or Insilico Spyball pigment powder and water based slurry (configured to undergo a change in color state at various ranges which may include −8° C. to 60° C., 0° C. to 60° C., 5° C. to 60° C., 10° C. to 60° C., or 15° C. to 60° C.). Semi-irreversible thermochromic materials may be configured to exhibit color states in blue, black, turquoise, orange, magenta, red, purple, green, yellow, violet, brown, dark blue, transparent, or clear. Several examples of semi-irreversible thermochromic materials are described in greater detail below. It will be appreciated that the color states listed above are purely exemplary and other color states may exist.

If the first thermochromic material 106 is configured to have reversible properties, the first thermochromic material 106 will return to the first initial color state when the first thermochromic material 106 warms above the low temperature threshold after having been in the low excursion color state and exposed to a temperature below the low temperature threshold.

If the second thermochromic material 108 is configured to have reversible properties, the second thermochromic material 108 will return to the second initial color state when the second thermochromic material 108 cools below the high temperature threshold after having been in the high excursion color state and exposed to a temperature above the high temperature threshold. If the mixture 102 is configured to have reversible properties, the mixture 102 will return to the base mixture color state when the mixture 102 warms above the low temperature threshold after having been in the low mixture excursion color state and exposed to a temperature below the low temperature threshold. In addition, the mixture 102 will return to the base mixture color state when the mixture 102 cools below the high temperature threshold after having been in the high mixture excursion color state and exposed to a temperature above the high temperature threshold.

Likewise, if the first thermochromic material 106 is configured to have semi-irreversible properties, the first thermochromic material 106 will remain in the low excursion color state when the first thermochromic material 106 warms above the low temperature threshold after having been exposed to a temperature below the low temperature threshold, as along as a reset temperature for the first material is not exceeded. Generally this reset temperature is selected to be well outside the normal operating range of the device, e.g., using a cryogenic spray at a temperature much lower than any normal ambient conditions. If the second thermochromic material 108 is configured to have semi-irreversible properties, the second thermochromic material 108 will remain in the high excursion color state when the second thermochromic material 108 cools below the high temperature threshold after having been exposed to a temperature above the high temperature threshold, as long as it does not go below a reset temperature for the second material. Again, this reset temperature is selected to be well outside the normal operating range of the device. In some examples, reset temperatures are greater than 60° C. As one example, a reset temperature that required resetting the low temperature indicator at a temperature of approximately 100° C., e.g., by exposing the indicator to boiling water temperature, would not normally be encountered in the use of the device in ambient conditions, but would be a temperature exposure that is easy to achieve as a practical matter in a controlled way, by exposing the indicator to boiling water.

In the instance where either the first thermochromic material's 106 color change or the second thermochromic material's 108 color change is semi-irreversible, a third mixture excursion color state may be produced. This may occur in instances where the temperature exposure indicator 100 has undergone temperature excursions both below the low temperature threshold and above the high temperature threshold. This third mixture excursion color state is visibly distinguishable from the base mixture color, the low mixture excursion color state, and the high mixture excursion color state.

Composition of Mixture and Thermochromic Materials

In the present disclosure, the composition of the first thermochromic material 106 and the second thermochromic material 108 may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the composition may be one of leuco dye, a micro-encapsulated leuco-dye, microencapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof.

In an embodiment, the composition of the first thermochromic material 106 and the second thermochromic material 108 may be one of polyoxymethylenemelamine, maleate polymer, ODB-TI, Green DCF, Behenic acid methylester, resin, color modifier, bisphenol A derivative, leuco dye, and UV absorber. In an embodiment, the compositions may also be available in pigment powder form, water-based ink or slurry matrixes. For example, a water based slurry having the components: melamine formaldehyde resin, 3-diethylamino-6-methyl-7,2,4-xylidinofluoran, water, and aromatic ester may be used.

In some embodiments, the mixture 102 is formulated as an ink. In formulating the ink, pigments of the first thermochromic material 106 and the second thermochromic material 108 may be used. In one such embodiment, the pigments may be microencapsulated. The microencapsulated pigments may be large in size (e.g. 3 to 12 μm) and as a result may settle at the bottom of the mixture when other components are added. When the ink is printed onto the substrate 104, the settling behavior of the first thermochromic material and of the second thermochromic material may affect the color-changing temperature response characteristics of the temperature exposure indicator 100. As a result, each microencapsulated pigment needs to preferably be evenly distributed and uniformly blended into the mixture 102 at a precise concentration to provide the correct response to the predetermined temperature threshold.

In one example, the addition of too much of the first thermochromic material, which is configured to change at a low predetermined temperature threshold, may cause the mixture 102 to not visually change color states at a high predetermined temperature threshold. To evenly distribute and uniformly blend the microencapsulated pigments, it may be advantageous for a paste to be made with the pigments before blending with other components.

The ink of the mixture 102 may include the first thermochromic material 106, the second thermochromic material 108, a rheology modifier, a de-foamer, a resin, and water. The rheology modifier may be added to control surface tension of the mixture 102 and optimize flow characteristics. In some embodiments and depending on the printing method, the rheology modifier may be a thickening agent. The de-foamer may be added to reduce or minimize the formation of foam. The resin may be added to increase the adhesive properties of the mixture 102 and act as a binder. This allows the pigments of the first thermochromic material 106 and the second thermochromic material 108 to become more evenly dispersed within the mixture 102 and allows the mixture 102 to better bind to the surface of the substrate 104. The water may be added as a solvent. In other embodiments, a wetting agent may also be included as an additive to the ink to improve flow characteristics and affect the surface tension of the ink. The wetting agent thus allows the ink of the mixture 102 to better spread onto the substrate 104.

It is necessary to appropriate specific ratios of each component in the mixture 102 in order to facilitate transfer of the mixture 102 onto the substrate 104. In one example formulation, the total weight of the mixture 102 contains 10-20% of the first thermochromic material, 10-20% of the second thermochromic material, 0-2% of the rheology modifier, 0-2% of the de-foamer, 15-25% resin, and 40-60% water. It is important that there is an appropriate thermochromic material to resin ratio to ensure the viscosity of the mixture 102 is smooth and uniform. A high thermochromic material to resin ratio may appear clumpy and non-uniform which inhibits the ability for the mixture 102 to be printed onto the substrate 104. In flexographic printing or thermal transfer printing, a mixture 102 with a high thermochromic material to resin ratio is not printable. Additionally, it is important to ensure that additional components such as the rheology modifier, de-foamer, or resin are of a neutral pH (e.g. 7) as acidic or alkaline components may damage the microencapsulated pigment structure. If the microencapsulated pigment is damaged, this may affect the quality or color of the base mixture color state, the low mixture excursion color state, or the high mixture excursion color state. In addition, a damaged microencapsulated pigment may affect the temperature response of the mixture 102. As one example, a pigment configured to change color state at 20° C. may instead change color at 15° C. or 25° C. affecting the efficacy of the temperature exposure indicator 100.

The composition of each mixture 102 is dependent on the printing method of mixture 102 onto the substrate 104. For instance, the resin acts as a carrier for the mixture 102 as an adhesive, so the resin must be compatible with the material of the substrate 104. As a result, the mixture 102 may be a flexographic ink, a screen printing ink, a gravure ink, a rotary ink, a digital ink, or an ink compatible with any other printing process. The following paragraphs detail possible mixture 102 compositions for flexographic, screen, and gravure printing processes. It will be appreciated that other printing processes may be employed to affix the mixture 102 to the substrate 104.

In a flexographic printing process, the first and second thermochromic materials may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the composition may be one of leuco dye, a micro-encapsulated leuco-dye, microencapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof. The rheology modifier may be an acrylic polymer or copolymer. Other rheology modifiers may be one of: (i) Cellosize QP 4400H; (ii) Acrysol RM-8; (iii) Acrysol RM-8W; (iv) Acrysol RM-242; (v) Additol VXW 6360; (vi) Tego Viscoplus 3060; (vii) Dynol 980; (viii) Tego Wet 270; (ix) Tego Wet 250; (x) Tego Twin 4100; (xi) Additol VXW 6396; or (xii) Modaflow Powder III. The de-foamer may be selected from the group of (i) Additol XW 6569; (ii) Additol WT 102 DF-M; (iii) Surfynol DF-58; (iv) Airase 5655; (v) Tego Foamex 9; (vi) Tego Foamex 852; (vii) Tego Foamex 1488; or (viii) Tego Airex 922. The resin may be selected from the group of (i) an acrylic polymer; (ii) a copolymer; (iii) a polyvinyl alcohol; (iv) polyacrylate; (v) a styrene acrylic copolymer; (v) Neocryl A-1052; (vi) Neocryl BT-24; (vii) Epotuf 91-263; (viii) Ottopol 25-50E; or (ix) Ottopol 25-30. Water may be replaced or used in combination with another solvent such as (i) n-Propanol; (ii) IPA; or (iii) butyl alcohol.

In a screen printing process, the first and second thermochromic materials may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the composition may be one of leuco dye, a micro-encapsulated leuco-dye, micro-encapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof. The rheology modifier may be selected from the group of (i) Cellosize QP 4400H; (ii) Acrysol RM-8; (iii) Acrysol RM-8W; (iv) Acrysol RM-242; (v) Additol VXW 6360; (vi) Tego Viscoplus 3060; (vii) Dynol 980; (viii) Tego Wet 270; (ix) Tego Wet 250; (x) Tego Twin 4100; (xi) Additol VXW 6396; or (xii) Modaflow Powder III. The de-foamer may be selected from the group of (i) Additol XW 6569; (ii) Additol WT 102 DF-M; (iii) Surfynol DF-58; (iv) Airase 5655; (v) Tego Foamex 9; (vi) Tego Foamex 852; (vii) Tego Foamex 1488; or (viii) Tego Airex 922. The resin may be selected from the group of (i) vinyl resin; (ii) acrylic resin; (iii) polyurethane; (iv) alkyd resin; (v) epoxy resin; (vi) hydrocarbon wax; (v) Epotuf 91-263; (vi) nitrocellulose; (vii) Ottopol 25-30; (viii) Ottopol 25-50E; (ix) Filtrez 3320 A; (x) styrene acrylic emulsion; (xi) Rhoplex 52; or (xii) Rovine 6111.

Water may be replaced or used in combination with another solvent such as volatile organic solvents and aliphatic hydrocarbons. Other solvents may be one of: (i) ethanol; (ii) isopropanol; (iii) acetate esters; (iv) glycol ethers; (v) butyl alcohol; (vi) n-propanol; (vii) MEK; or (viii) ethyl 3-ethoxypropionate.

In a gravure printing process, the first and second thermochromic materials may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the composition may be one of leuco dye, a micro-encapsulated leuco-dye, micro-encapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof. The rheology modifier may be an acrylic polymer or copolymer. Other rheology modifiers may be one of: (i) Joncryl 538A; (ii) Joncryl 682; (iii) Neocryl B-818; (iv) a carnauba wax; (v) a candelilla wax; (vi) a hydrocarbon wax; (vii) polyvinyl acetate; or (viii) polyvinyl pyrrolidone. Water may be replaced or used in combination with another solvent such as volatile organic solvents and aliphatic hydrocarbons. Other solvents may be one of: (i) ethanol; (ii) isopropanol; (iii) acetate esters; (iv) glycol ethers; (v) butyl alcohol; or (vi) n-propanol. Other additives may include: (i) titanium dioxide; (ii) Sipernat 22LS; (iii) silica; or (iv) plasticizers.

Color State Changes

Figure 2A:
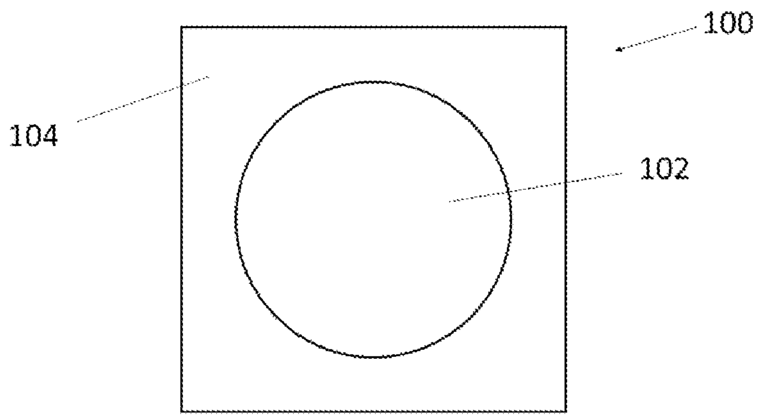
FIG. 2A illustrates a front view of a temperature exposure indicator at a base mixture color state in a base temperature range.
Figure 2B:
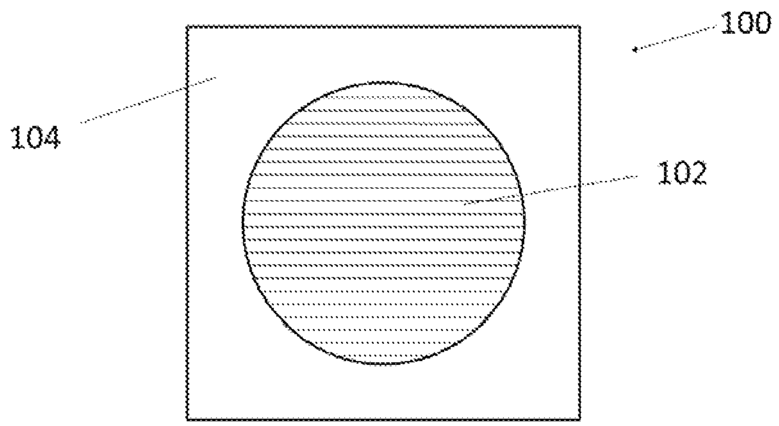
FIG. 2B illustrates a front view of a temperature exposure indicator at a low mixture excursion color state below a low temperature threshold.
Figure 2C:
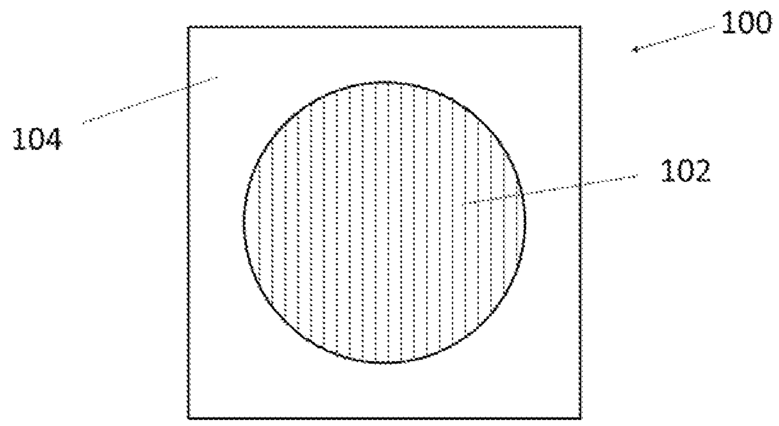
FIG. 2C illustrates a front view of a temperature exposure indicator at a high mixture excursion color state above a high temperature threshold.

FIGS. 2A-2C illustrate one example of a temperature exposure indicator 100. FIG. 2A illustrates a temperature exposure indicator 100 at a base temperature range. In this example, both the first thermochromic material 106 and the second thermochromic material 108 exhibit transparent optical properties at the base temperature range which combine to give the mixture 102 a base mixture color state that is transparent. FIG. 2B demonstrates exposure to the low temperature threshold, which causes the first thermochromic material 106 to change to its low excursion color state, which in this example is blue. Below the low temperature threshold, the second thermochromic material 108 remains at its second initial color state, here transparent, as the second thermochromic material 108 is configured to change to its high excursion color state only when exposed to temperatures above its high temperature threshold. In this example, the high temperature threshold necessary to change the second thermochromic material's 108 color state is higher than the low temperature threshold required to change the first thermochromic material's 106 color state to its low excursion color state. Because the first thermochromic material 106 in the low excursion color state is blue and the second thermochromic material 108 in the second initial color state is transparent, the color of the mixture 102, at a low mixture excursion color state below the low temperature threshold, is visibly displayed as blue. In this instance, the low mixture excursion color state is not visually distinguishable from the low excursion color state. On the contrary, FIG. 2C demonstrates exposure to the high temperature threshold, which causes the second thermochromic material 108 to change to its high excursion color state, which in this example is pink. Above the high temperature threshold, the first thermochromic material 106 remains at its first initial color state, here transparent, as the first thermochromic material 106 is configured to change to its low excursion color state only when exposed to temperatures below its low temperature threshold. In this example, the low temperature threshold necessary to change the first thermochromic material's 106 color state is lower than the high temperature threshold required to change the second thermochromic material's 108 color state to its high excursion color state. Because the second thermochromic material 108 in the high excursion color state is pink and the first thermochromic material 106 in the first initial color state is transparent, the color of the mixture 102, at a high mixture excursion color state above the high temperature threshold, is visibly displayed as pink. In this instance, the high mixture excursion color state is not visually distinguishable from the high excursion color state.

Figure 3A:
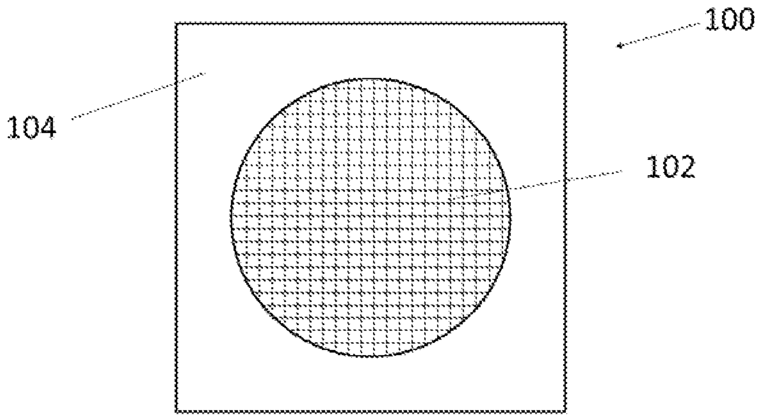
FIG. 3A illustrates a front view of a temperature exposure indicator at a base mixture color state in a base temperature range.
Figure 3B:
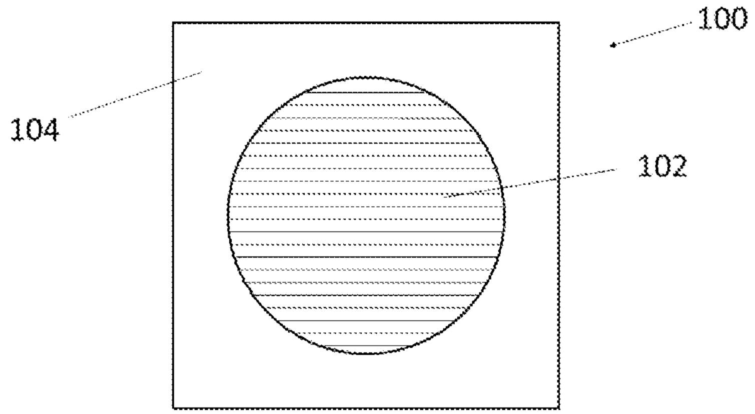
FIG. 3B illustrates a front view of a temperature exposure indicator at a low mixture excursion color state below a low temperature threshold.
Figure 3C:
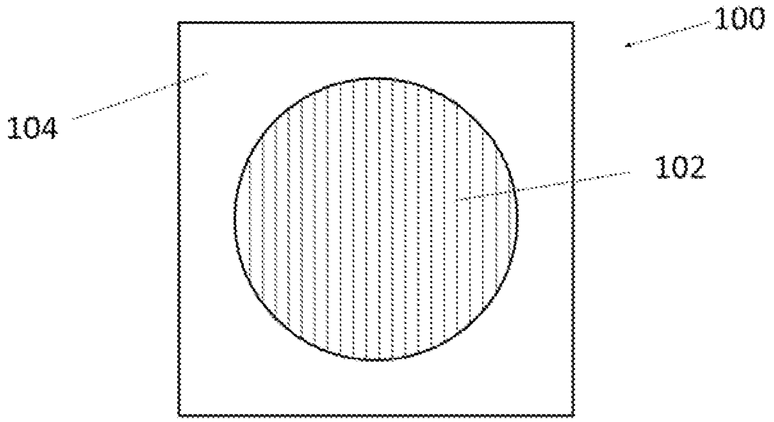
FIG. 3C illustrates a front view of a temperature exposure indicator at a high mixture excursion color state above a high temperature threshold.

FIGS. 3A-3C illustrate another example of a temperature exposure indicator 100. FIG. 3A illustrates a temperature exposure indicator 100 at a base temperature range. In this example, the base mixture color state is visibly yellow. Since the base mixture color state is a combination of the first initial color state and the second initial color state, the base mixture color state may be comprised of a transparent first initial color state and a yellow second initial color state, a yellow first initial color state and a transparent second initial color state, a yellow first initial color state and a yellow second initial color state, or any other combination that would result in a yellow base mixture color state. FIG. 3B demonstrates exposure to the low temperature threshold, which causes the first thermochromic material 106 to change to its low excursion color state, which in this example is blue. Below the low temperature threshold, the second thermochromic material 108 remains at its second initial color state, here either yellow or transparent, as the second thermochromic material 108 is configured to change to its high excursion color state only when exposed to temperatures above its high temperature threshold. In this example, the high temperature threshold necessary to change the second thermochromic material's 108 color state is higher than the low temperature threshold required to change the first thermochromic material's 106 color state to its low excursion color state. In this example, the first thermochromic material 106 in the low excursion color state is an opaque blue and the second thermochromic material 108 in the second initial color state is light yellow or transparent, the color of the mixture 102, at a low mixture excursion color state below the low temperature threshold, is visibly displayed as blue. In this instance, the low mixture excursion color state may be visually distinguishable from the low excursion color state, especially if the second initial color state is yellow. On the contrary, FIG. 3C demonstrates exposure to the high temperature threshold, which causes the second thermochromic material 108 to change to its high excursion color state, which in this example is pink. Above the high temperature threshold, the first thermochromic material 106 remains at its first initial color state, here either yellow or transparent, as the first thermochromic material 106 is configured to change to its low excursion color state only when exposed to temperatures below its low temperature threshold. In this example, the low temperature threshold necessary to change the first thermochromic material's 106 color state is lower than the high temperature threshold required to change the second thermochromic material's 108 color state to its high excursion color state. Because the second thermochromic material 108 in the high excursion color state is opaque pink and the first thermochromic material 106 in the first initial color state is light yellow or transparent, the color of the mixture 102, at a high mixture excursion color state above the high temperature threshold, is visibly displayed as pink. In this instance, the high mixture excursion color state may be visually distinguishable from the high excursion color state, especially if the second initial color state is yellow.

Low temperature thresholds, high temperature thresholds, and base temperature ranges vary depending on the composition of the mixture 102. In some examples, the low temperature threshold may be 0° C., the base temperature range may be 10° C. to 15° C., and the high temperature threshold may be 30° C. In other examples, the low temperature threshold may be 5° C., the base temperature range may be 0° C. to 55° C., and the high temperature threshold may be 60° C. In yet other examples, the low temperature threshold may be −40° C., the base temperature range may be −35° C. to 20° C., and the high temperature threshold may be 100° C. Notably, the low temperature thresholds, high temperature thresholds, and base temperature ranges may differ in reversible or semi-irreversible thermochromic materials as described below.

Example I—Reversible Thermochromic Materials

Reversible thermochromic materials configured to change color state in response to temperatures above a high temperature threshold and below a low temperature threshold were tested. In one example, the first thermochromic material and second thermochromic material were reversible thermochromic color changing pigments that had different activation temperatures (e.g., high and low threshold temperatures) and color changing properties. The first thermochromic material was a 5 C Reversible Blue ink which changes from blue to colorless below a temperature of 5° C. The second thermochromic material was a 60 C RTP Pink ink which changes from colorless to pink above a temperature of 60° C.

The pigments described above were added (approximately 12% to 15% weight percent) to formulate a mixture, such as an ink, containing acrylic resin, a rheology modifier, a de-foamer, and water. The resulting mixture was coated in a single uniform layer onto a polypropylene film using a 1.5 mil bird drawdown bar. The coated sample with the mixture was then left to dry at room temperature and a small section was then tested to observe the color-changing appearance under both low and high temperature conditions.

The mixture was observed for appearance of blue color under refrigerated conditions and appearance of pink color at heated conditions. In one test, the mixture was exposed first to a decreasing temperature from 22° C. to 0° C., then to an increasing temperature of 0° C. to 65° C., and finally again to a decreasing temperature of 65° C. to 22° C. The temperature of the mixture was adjusted by applying the mixture onto the surface of a temperature controlled plate capable of both heating and cooling (e.g. a Peltier liquid cooled laboratory plate). The temperature of the mixture was changed incrementally as the color appearance at each temperature was noted.

Initially, when first exposed to 22° C., the mixture remained colorless in the base mixture color state. As the mixture was cooled to between 5° C. and 0° C., the mixture changed rapidly from colorless to a blue, its low mixture excursion color state. The blue color was heavily pigmented. Then, the mixture was exposed to heat and the mixture returned to a colorless base mixture color state between 3° C. and 10° C. As the temperature continued to rise, the mixture slowly changed to pink, its high mixture excursion color state, between 50° C. and 60° C. Finally, the mixture was again cooled and returned to its base mixture color state as colorless between 35° C. and 22° C.

Example II—Reversible Thermochromic Materials

More reversible thermochromic materials configured to change color state in response to temperatures above a high temperature threshold and below a low temperature threshold were tested. In one example, the first thermochromic material and second thermochromic material were reversible thermochromic color changing pigments that had different activation temperatures (e.g., high and low threshold temperatures) and color changing properties. The first thermochromic material was a 18 C Reversible Green to Red ink which changes from green to red below a temperature of 18° C. The second thermochromic material was a 35 C Black to Colorless ink which changes from black to colorless above a temperature of 40° C.

The pigments described above were added (approximately 12% to 15% weight percent) to formulate a mixture, such as an ink, containing acrylic resin, a rheology modifier, a de-foamer, and water. The resulting mixture was coated in a single uniform layer onto a polypropylene film using a 1.5 mil bird drawdown bar. The coated sample with the mixture was then left to dry at room temperature and a small section was then tested to observe the color-changing appearance under both low and high temperature conditions.

The mixture was observed for appearance of a brown/red/purple mixed color under refrigerated conditions and appearance of a light grey or colorless color at heated conditions. At room temperature, the mixture appeared dark green/black.

Example III—Semi-Reversible Thermochromic Materials

Semi-irreversible thermochromic materials configured to change color state in response to temperatures above a high temperature threshold and below a low temperature threshold were tested. In one example, the first thermochromic material and second thermochromic material were semi-irreversible thermochromic color changing pigments that had different activation temperatures (e.g., high and low threshold temperatures) and color changing properties.

The first thermochromic material was a customized Spyball MT 60 Dark Blue ink which changes from blue to colorless below a temperature of 5° C. The second thermochromic material was a 60 C RTP Pink ink which changes from colorless to pink above a temperature of 60° C.

The pigments described above were added (approximately 12% to 15% weight percent) to formulate a mixture, such as an ink, containing acrylic resin, a rheology modifier, a de-foamer, and water. The resulting mixture was coated in a single uniform layer onto a polypropylene film using a 1.5 mil bird drawdown bar. The coated sample with the mixture was then left to dry at room temperature and a small section was then tested to observe the color-changing appearance under both low and high temperature conditions.

The mixture was observed for appearance of blue color under refrigerated conditions and appearance of pink color at heated conditions. In one test, the mixture was exposed first to a decreasing temperature from 22° C. to 0° C., then to an increasing temperature of 0° C. to 65° C., and finally again to a decreasing temperature of 65° C. to 22° C. The temperature of the mixture was adjusted by applying the mixture onto the surface of a temperature controlled plate capable of both heating and cooling (e.g. a Peltier liquid cooled laboratory plate). The temperature of the mixture was changed incrementally as the color appearance at each temperature was noted.

Initially, when first exposed to 22° C., the mixture remained colorless in the base mixture color state. As the mixture was cooled to between 10° C. and 0° C., the mixture changed slowly from colorless to a blue, its low mixture excursion color state. Then, the mixture was exposed to heat, but did not return to its base mixture color state. Rather, the mixture abruptly changed from a blue to a pink, its high excursion color state between 53° C. and 60° C. Finally, the mixture was again cooled and returned to its base mixture color state as colorless between 45° C. and 40° C.

Example IV—Semi-Reversible Thermochromic Materials

More semi-irreversible thermochromic materials configured to change color state in response to temperatures above a high temperature threshold and below a low temperature threshold were tested. In one example, the first thermochromic material and second thermochromic material were semi-irreversible thermochromic color changing pigments that had different activation temperatures (e.g., high and low threshold temperatures) and color changing properties. The first thermochromic material was a customized Spyball MT Black ink which changes from colorless to black below a temperature of 15° C. The second thermochromic material was a combination of a 40 C RTP Black ink which changes from colorless to black above a temperature of 40° C. and a 35 C RTP Black ink which changes from colorless to black above a temperature of 35° C.

The pigments described above were added (approximately 12% to 15% weight percent) to formulate a mixture, such as an ink, containing acrylic resin, a rheology modifier, a de-foamer, and water. The resulting mixture was coated in a single uniform layer onto a polypropylene film using a 1.5 mil bird drawdown bar. The coated sample with the mixture was then left to dry at room temperature and a small section was then tested to observe the color-changing appearance under both low and high temperature conditions.

The mixture was observed for appearance of a black color under refrigerated conditions and appearance of a black color at heated conditions. At room temperature, the mixture appeared colorless.

Example V—Semi-Reversible Thermochromic Materials

More semi-irreversible thermochromic materials configured to change color state in response to temperatures above a high temperature threshold and below a low temperature threshold were tested. In one example, the first thermochromic material and second thermochromic material were semi-irreversible thermochromic color changing pigments that had different activation temperatures (e.g., high and low threshold temperatures) and color changing properties. The first thermochromic material was a Spyball MT 60 C slurry which changes from colorless to dark blue below a temperature of 60° C. The second thermochromic material was a 60 C RTP Pink ink which changes from colorless to pink above a temperature of 60° C.

The pigments described above were added (approximately 12% to 15% weight percent) to formulate a mixture, such as an ink, containing acrylic resin, a rheology modifier, a de-foamer, and water. The resulting mixture was coated in a single uniform layer onto a polypropylene film using a 1.5 mil bird drawdown bar. The coated sample with the mixture was then left to dry at room temperature and a small section was then tested to observe the color-changing appearance under both low and high temperature conditions.

The mixture was observed for appearance of a dark blue color under 60° C. and appearance of a pink color above 60° C. At room temperature, the mixture appeared dark blue. When the mixture was exposed to temperatures below −15° C., the mixture appeared dark blue. When the mixture was exposed to temperatures above 60° C., the mixture appeared pink.

Color References

To further improve the accuracy of temperature exposure indicators, and to give a point of calibration, both digital and visual, multiple color references can be added to the substrate 104 as shown in FIGS. 4A-5D. Advantageously, scanning devices may be calibrated by the color references to determine whether the temperature exposure indicator 100 has been exposed to specific predetermined temperatures. The scanning device may use the color references to compare the color references to the visible mixture 102 color state of the temperature exposure indicator 100. The color references of a known optical property, such as a known reflectivity, can be used in auto-calibration of the scanning device at the reading color of interest. The color references may be positioned at any position on the substrate 104, though the closer the color references are to the mixture 102, the easier it is for a scanning device to recognize and interpret both the color references and mixture color state. It should be appreciated that the color references may comprise any shape or orientation on the substrate 104 and the following shapes and orientations are purely exemplary and other shapes or orientations may exist.

The color references may be used in assessing the temperature exposure indicator 100. For example, a scanning device may be calibrated based on an optical property of a color reference. In another example, an optical property of the temperature exposure indicator 100 may be compared to a related optical property of a color reference. The optical properties of the temperature exposure indicator 100 and the color references may include an instantaneous value or an average value of one or more of the following properties: color, reflectance, intensity, color density, or RGB values. For example, the color state of the mixture 102 and the color of the color reference may be compared when assessing and/or analyzing the temperature exposure indicator 100.

The color references may be printed onto the substrate 104 or may be affixed onto the substrate 104 in another fashion. The color references may be affixed to the substrate 104 by an adhesive. In some embodiments, the adhesive is applied directly to the substrate 104. In other embodiments, the adhesive is pre-placed as an adhesive backing on the color references. In this example, the adhesive may cover the entire color reference face or only a portion of the color reference. The adhesive may be selected from a group consisting of an aqueous emulsion adhesive such as Avery Dennison E5583, Polyco 2160 Carboxylated Polyvinyl Acetate, Covinax 289-01 acrylic copolymer emulsion, Covinax 525-66 DEV Vinyl modified acrylic copolymer emulsion, Henkel Aquence PS acrylic emulsion, or Henkel Technomelt PS rubber based PSA; an acrylic polymer or co-polymer; an amine salt of an acrylic co-polymer; a carnauba wax; a candelilla wax; a hydrocarbon wax; Neocryl A-1052; Neocryl BT-24; Neocryl B-818; Epotuf 91-263; Ottpol 25-50E; Ottopol 25-30; Joncryl 682; and Joncryl 538A. The adhesive can be attached manually by an operator, or by a machine. In some embodiments, the adhesive may be placed on a release liner to adhere to the substrate 104.

Figure 4A:
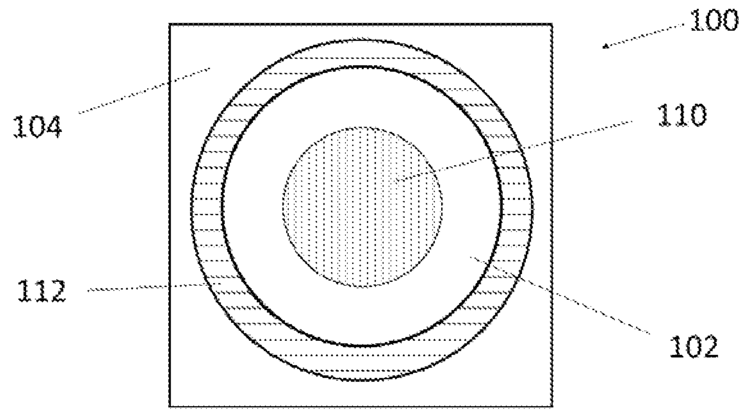
FIG. 4A illustrates a front view of a temperature exposure indicator with a first color reference and a second color reference at a base mixture color state in a base temperature range.
Figure 4B:
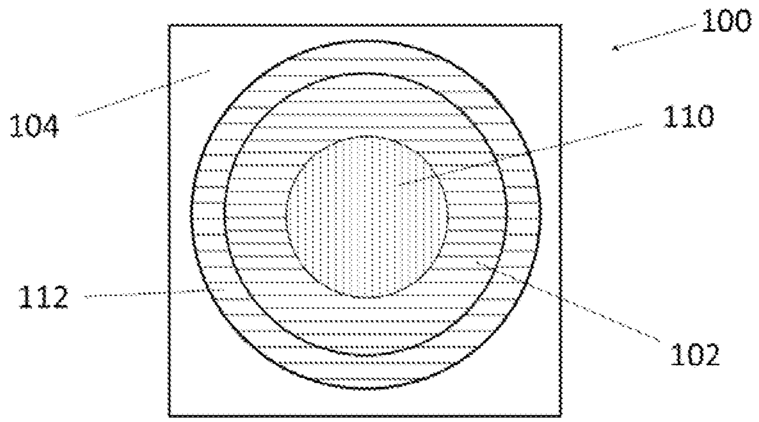
FIG. 4B illustrates a front view of a temperature exposure indicator with a first color reference and a second color reference at a low mixture excursion color state below a low temperature threshold.
Figure 4C:
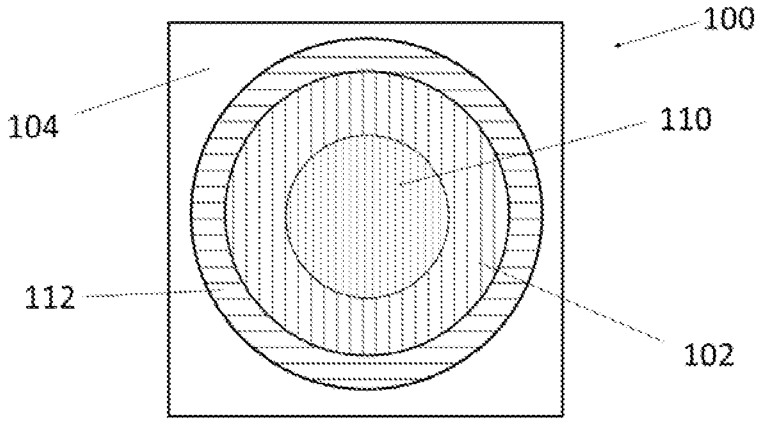
FIG. 4C illustrates a front view of a temperature exposure indicator with a first color reference and a second color reference at a high mixture excursion color state above a high temperature threshold.

FIGS. 4A-4C illustrate one example of a temperature exposure indicator 100 with a first color reference 110 and a second color reference 112. The first color reference 110 is colored in a first reference color which corresponds to a color state within the low mixture excursion color state. In this example, the low mixture excursion color state is blue, so the first color reference 110 is colored in blue. The first color reference 110 is located in a circle and is entirely enveloped by the mixture 102. The second color reference 112 is colored in a second reference color which corresponds to a color state within the high mixture excursion color state. In this example, the high mixture excursion color state is pink, so the second color reference 112 is colored in pink. The second color reference 112 is located in an annular shape and surrounds the mixture 102.

FIG. 4A illustrates a temperature exposure indicator 100 at a base temperature range. In this example, both the first thermochromic material 106 and the second thermochromic material 108 exhibit transparent optical properties at the base temperature range which combine to give the mixture 102 a base mixture color state that is transparent.

FIG. 4B demonstrates exposure to a temperature below the low temperature threshold, which causes the first thermochromic material 106 to change to its low excursion color state, which in this example is blue. Below the low temperature threshold, the second thermochromic material 108 remains at its second initial color state, here transparent, as the second thermochromic material 108 is configured to change to its high excursion color state only when exposed to temperatures above its high temperature threshold. In this example, the high temperature threshold necessary to change the second thermochromic material's 108 color state is higher than the low temperature threshold required to change the first thermochromic material's 106 color state to its low excursion color state. Because the first thermochromic material 106 in the low excursion color state is blue and the second thermochromic material 108 in the second initial color state is transparent, the color of the mixture 102, at a low mixture excursion color state below the low temperature threshold, is visibly displayed as blue. Because the first color reference is configured to display a color state within the low mixture excursion color state, the first color reference visually matches the mixture 102 while in the low temperature threshold, here by both displaying blue. Notably, the match between the low mixture excursion color state and first color reference may not be an exact match, however, it should be enough to allow a user or machine to optically recognize the similarity in pigments.

In contrast with FIG. 4B, which showed low temperature excursion, FIG. 4C demonstrates exposure to a temperature above the high temperature threshold, which causes the second thermochromic material 108 to change to its high excursion color state, which in this example is pink. Above the high temperature threshold, the first thermochromic material 106 remains at its first initial color state, here transparent, as the first thermochromic material 106 is configured to change to its low excursion color state only when exposed to temperatures below its low temperature threshold. In this example, the low temperature threshold necessary to change the first thermochromic material's 106 color state is lower than the high temperature threshold required to change the second thermochromic material's 108 color state to its high excursion color state. Because the second thermochromic material 108 in the high excursion color state is pink and the first thermochromic material 106 in the first initial color state is transparent, the color of the mixture 102, at a high mixture excursion color state above the high temperature threshold, is visibly displayed as pink. Because the second color reference is configured to display a color state within the high mixture excursion color state, the second color reference visually matches the mixture 102 while in the high temperature threshold, here by both displaying pink. Notably, the match between the high mixture excursion color state and second color reference may not be an exact match, however, it should be enough to allow a user or machine to optically recognize the similarity in pigments.

FIGS. 5A-5D illustrate another example of a temperature exposure indicator 100 with a first color reference 110 and a second color reference 112. The first color reference 110 is colored in a first reference color which corresponds to a color state within the low mixture excursion color state. In this example, the low mixture excursion color state is blue, so the first color reference 110 is colored in blue. The first color reference 110 comprises a semi-circle that surrounds an internal rectangular-shaped mixture 102. The second color reference 112 is colored in a second reference color which corresponds to a color state within the high mixture excursion color state. In this example, the high mixture excursion color state is pink, so the second color reference 112 is colored in pink. The second color reference 112 comprises a semi-circle that surrounds an internal rectangular-shaped mixture 102.

Figure 5A:
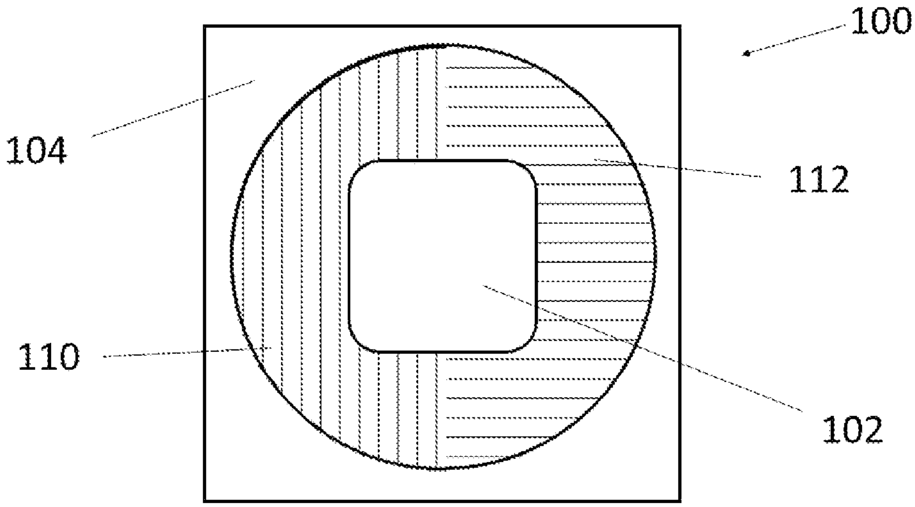
FIG. 5A illustrates a front view of a temperature exposure indicator with a first color reference and a second color reference at a base mixture color state in a base temperature range.

FIG. 5A illustrates a temperature exposure indicator 100 at a base temperature range. In this example, both the first thermochromic material 106 and the second thermochromic material 108 exhibit transparent optical properties at the base temperature range which combine to give the mixture 102 a base mixture color state that is transparent.

Figure 5B:
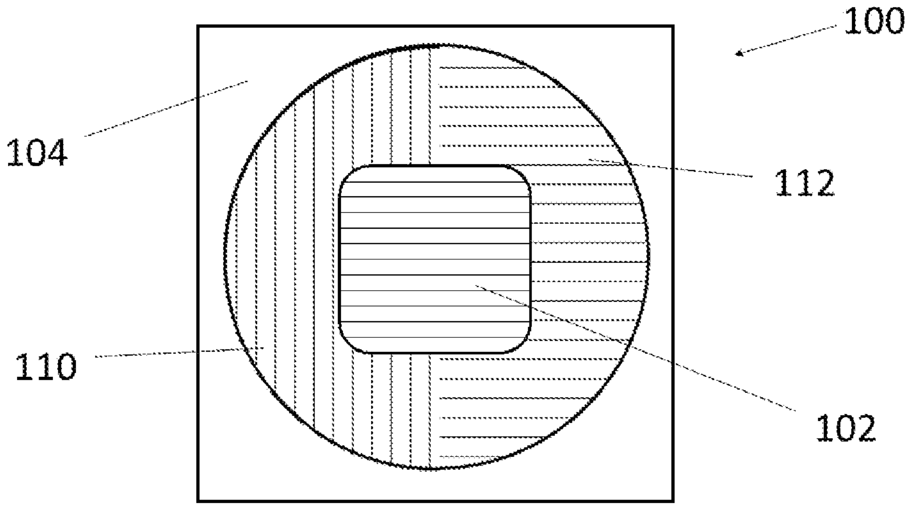
FIG. 5B illustrates a front view of a temperature exposure indicator with a first color reference and a second color reference at a low mixture excursion color state below a low temperature threshold.

FIG. 5B demonstrates exposure to the low temperature threshold, which causes the first thermochromic material 106 to change to its low excursion color state, which in this example is blue. Below the low temperature threshold, the second thermochromic material 108 remains at its second initial color state, here transparent, as the second thermochromic material 108 is configured to change to its high excursion color state only when exposed to temperatures above its high temperature threshold. In this example, the high temperature threshold necessary to change the second thermochromic material's 108 color state is higher than the low temperature threshold required to change the first thermochromic material's 106 color state to its low excursion color state. Because the first thermochromic material 106 in the low excursion color state is blue and the second thermochromic material 108 in the second initial color state is transparent, the color of the mixture 102, at a low mixture excursion color state below the low temperature threshold, is visibly displayed as blue. Because the first color reference is configured to display a color state within the low mixture excursion color state, the first color reference visually matches the mixture 102 while in the low temperature threshold, here by both displaying blue. Notably, the match between the low mixture excursion color state and first color reference may not be an exact match, however, it should be enough to allow a user or machine to optically recognize the similarity in pigments.

Figure 5C:
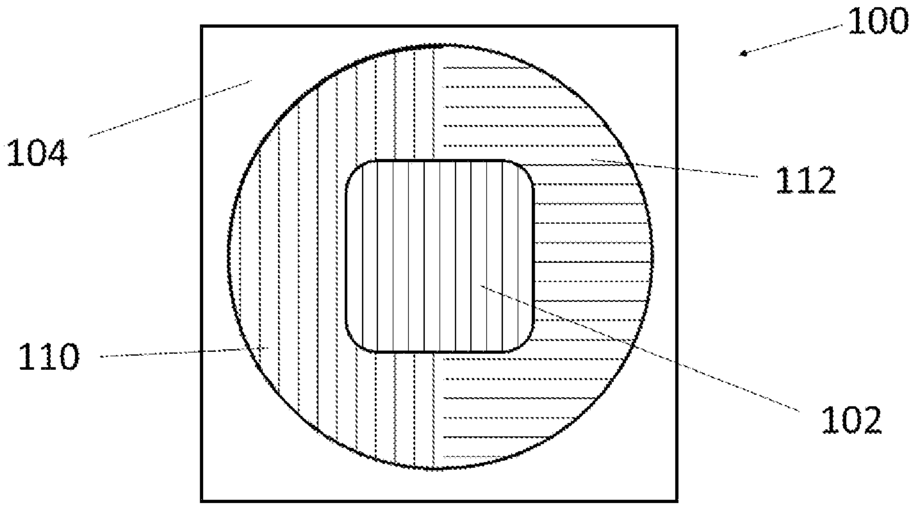
FIG. 5C illustrates a front view of a temperature exposure indicator with a first color reference and a second color reference at a high mixture excursion color state above a high temperature threshold.

In contrast to FIG. 5B, FIG. 5C demonstrates exposure to the high temperature threshold, which causes the second thermochromic material 108 to change to its high excursion color state, which in this example is pink. Above the high temperature threshold, the first thermochromic material 106 remains at its first initial color state, here transparent, as the first thermochromic material 106 is configured to change to its low excursion color state only when exposed to temperatures below its low temperature threshold. In this example, the low temperature threshold necessary to change the first thermochromic material's 106 color state is lower than the high temperature threshold required to change the second thermochromic material's 108 color state to its high excursion color state. Because the second thermochromic material 108 in the high excursion color state is pink and the first thermochromic material 106 in the first initial color state is transparent, the color of the mixture 102, at a high mixture excursion color state above the high temperature threshold, is visibly displayed as pink. Because the second color reference is configured to display a color state within the high mixture excursion color state, the second color reference visually matches the mixture 102 while in the high temperature threshold, here by both displaying pink. Notably, the match between the high mixture excursion color state and second color reference may not be an exact match, however, it should be enough to allow a user or machine to optically recognize the similarity in pigments.

Figure 5D:
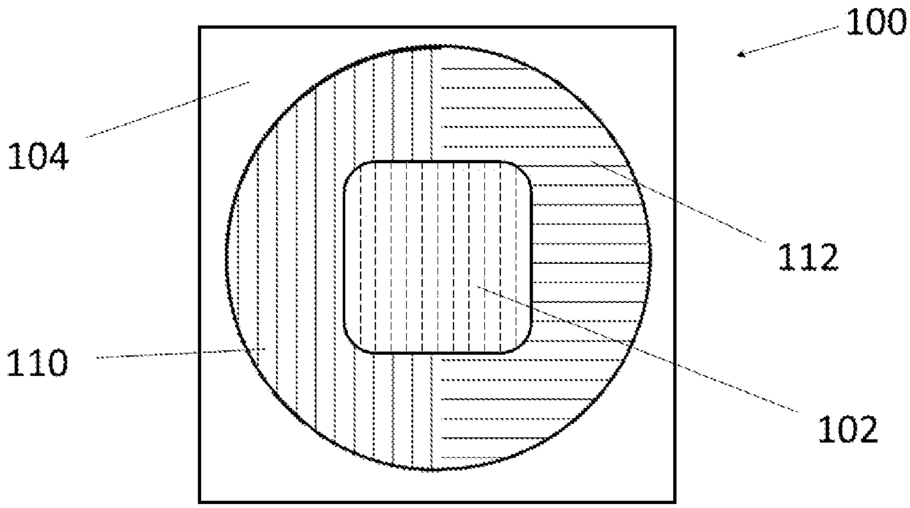
FIG. 5D illustrates a front view of a temperature exposure indicator with a first color reference and a second color reference at a third mixture excursion color state after having had temperature excursions both below the low temperature threshold and above the high temperature threshold.

FIG. 5D illustrates the mixture 102 in a third mixture excursion color state, here illustrated in purple, after having had temperature excursions both below the low temperature threshold and above the high temperature threshold. Neither the first color reference 110 nor the second color reference 112 matches the third mixture excursion color state, as the third mixture excursion color state is a color state that is visually distinguishable from either the low mixture excursion color state and the high mixture excursion color state. In some embodiments, a third color reference colored in a third reference color within the third mixture excursion color state may be added to the substrate 104.

Figure 6:
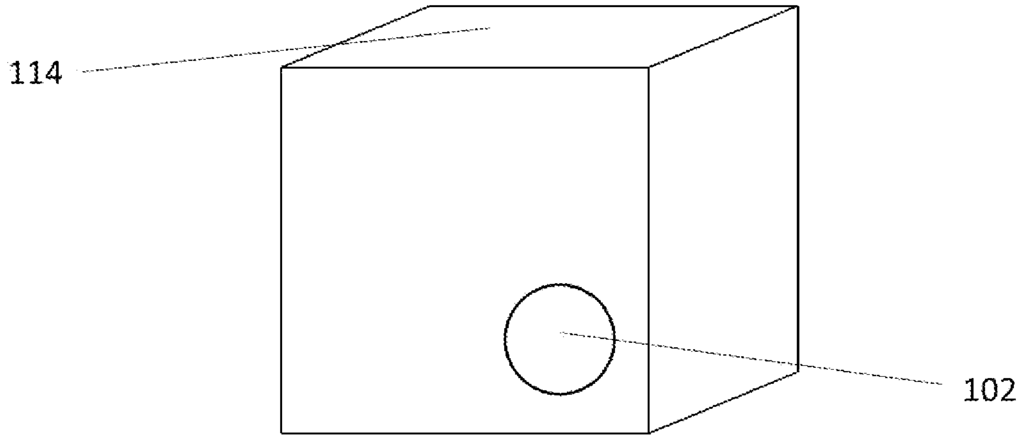
FIG. 6 illustrates a temperature exposure indicator affixed to a package.

The temperature exposure indicator 100 can be affixed to an article 114 containing a perishable host product (as shown in FIG. 6). The article may be a package, box, bag, label, container, or other exterior surface. Even though several of the illustrative examples described herein refer to packages, the described techniques and features may also similarly apply to any other article.

As the article 114 can be produced prior and separate to the temperature exposure indicator 100 application, the temperature exposure indicator 100 can be customized to each article 114. The perishable host product contained within the article 114 may have a predetermined specified exposure limit for the predetermined temperature threshold. The temperature exposure indicator 100 can then be placed onto the package wherein the mixture 102 is configured so that the mixture 102 transitions from the base mixture color state to either the low mixture excursion color state or high mixture excursion color state whenever the mixture 102 is exposed to the predetermined low temperature threshold or high temperature threshold, respectfully.

Producing a Temperature Exposure Indicator

Figure 7:
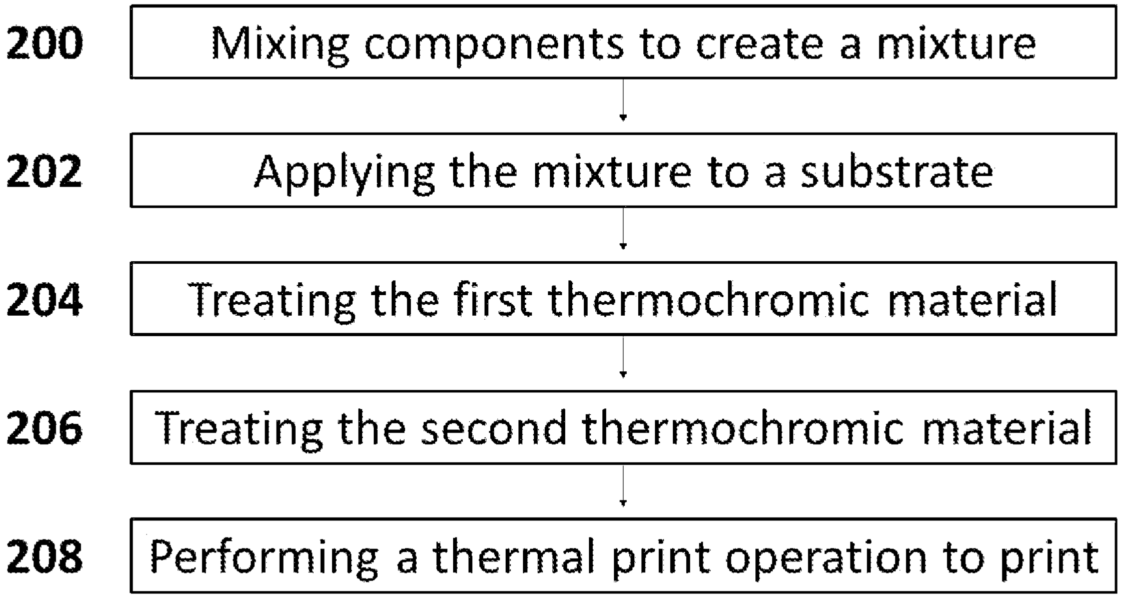
FIG. 7 illustrates a flow chart demonstrating the steps of producing a temperature exposure indicator.

A flowchart for producing a temperature exposure indicator 100 is also disclosed and shown in FIG. 7. In the first step 200, a mixture 102 is created by mixing components including a first thermochromic material 106 and a second thermochromic material 108. In some embodiments, components of the mixture 102 may also include a rheology modifier, a de-foamer, a resin, and water.

In the second step 202, the mixture 102 is applied to the substrate 104. In an embodiment, the mixture 102 may be applied to the substrate 104 may be applied using on the following techniques: screen printing, gravure, flexographic printing, ink jet printing, direct thermal transfer, or thermal transfer ribbons. In direct thermal transfer, the direct thermal printer does not use a thermal transfer ribbon, but instead the printable media itself is the mixture 102.

The mixture 102 is pressed against and moved past a thermal print head. The thermal print head receives data of a rendered bitmap and heats specific heating elements within a row of addressable heaters according to the data.

In another embodiment, the method of producing a temperature exposure indicator 100 further includes a step of pre-treating the first thermochromic material 106 to place it in the first initial color state and/or pre-treating the second thermochromic material 108 to place it in the second initial color state 204. In one embodiment, the step requires treating the first thermochromic material 106 to display a first initial color state. Often, the first thermochromic material 106, when shipped by a manufacturer, will arrive in its low excursion color state as the first thermochromic material 106 may be exposed to its low temperature threshold in transit. It will be appreciated that in other embodiments, other approaches for ensuring the first thermochromic material 106 is in the first initial color state may be employed. Additionally, in another embodiment, the method of producing a temperature exposure indicator 100 further includes a step of treating the second thermochromic material 108 to display a second initial color state. Often, the second thermochromic material 108, when shipped by a manufacturer, will arrive in its high excursion color state as the second thermochromic material 108 may be exposed to its high temperature threshold in transit. The treatment may occur before or after applying the materials. If the materials are pre-treated, it is important to maintain them in the appropriate base temperature range during the production process. If the materials are treated after being printed, this is not required.

In yet another embodiment, the method of producing a temperature exposure indicator 100 further includes a step of performing a thermal print operation to print the mixture 102 by a thermal transfer ribbon. The thermal transfer ribbon includes a release layer coated in an ink. In some examples, the ink contained within the release layer may include the mixture 102. The thermal transfer ribbons may include additives that advantageously improve dispersion, coating, and/or printing. Depending on the application, the thermal transfer ribbon 100 may be sized and shaped such that the consumption of environmental exposure indicator material, such as the mixture 102 is minimized during printing. For example, the thermal transfer ribbon 100 may be selectively coated with the mixture 102 or the width of the thermal transfer ribbon may be changed to reduce the amount of the mixture 102 left behind on a used thermal transfer ribbon.

One such thermal print operation may include configuring the second thermochromic material 108 to its high excursion color state by exposure to a temperature above the high temperature threshold and configuring the first thermochromic material 106 to its first initial color state by exposure to a temperature above the low temperature threshold. This may be accomplished by either putting the whole temperature exposure indicator 100 above the high temperature threshold and then selectively cooling the first thermochromic material 106, or by exposing the whole temperature exposure indicator 100 to a temperature below the low temperature threshold, and then using a thermal printer or other selective heating to expose all of the temperature exposure indicator 100 to a temperature above the high temperature threshold.

Conversely, another thermal print operation may include configuring the first thermochromic material 106 to its low excursion color state by exposure to a temperature below the low temperature threshold and configuring the second thermochromic material 108 to its second initial color state by exposure to a temperature below the high temperature threshold.

This may be accomplished by either putting the whole temperature exposure indicator 100 below the low temperature threshold and then selectively heating the second thermochromic material 108, or by exposing the whole temperature exposure indicator 100 to a temperature above the high temperature threshold, and then using a thermal printer or other selective cooling to expose all of the temperature exposure indicator 100 to a temperature below the low temperature threshold. In an embodiment, the cooling may occur through use of a cooling agent which may be a freeze spray or any other agent capable of achieving temperatures below the low temperature threshold.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. A temperature exposure indicator, comprising:

a substrate; and a mixture of a first thermochromic material and a second thermochromic material supported by the substrate, the first thermochromic material having a first initial color state while in a base temperature range and configured to change to a low excursion color state below a low temperature threshold, the second thermochromic material having a second initial color state while in the base temperature range and configured to change to a high excursion color state above a high temperature threshold, and the mixture configured to have a base mixture color state in the base temperature range, a low mixture excursion color state below the low temperature threshold, and a high mixture excursion color state above the high temperature threshold, wherein the first initial color state and second initial color state are colorless, white, or transparent, and the high excursion color state and low excursion color states are colored or dark.

2. The temperature exposure indicator of claim 1, wherein the base mixture color state is colorless, white, or transparent, and the low mixture excursion color state and high mixture excursion color state are colored or dark.

3. The temperature exposure indicator of claim 1, wherein the mixture is configured, after being in the low mixture excursion color state below the low temperature threshold, to return to the base mixture color state when the mixture warms above the low temperature threshold.

4. The temperature exposure indicator of claim 1, wherein the mixture is configured, after being in the high mixture excursion color state above the high temperature threshold, to return from the high mixture excursion color state to the base mixture color state when the mixture cools below the high temperature threshold.

5. The temperature exposure indicator of claim 1, further comprising:

a first color reference region colored in a first reference color corresponding to the low mixture excursion color state; and a second color reference region colored in a second reference color corresponding to the high mixture excursion color state.

6. The temperature exposure indicator of claim 1, wherein the mixture, is configured to have a third mixture excursion color state when the mixture returns to the base temperature range after having excursions both below the low temperature threshold and above the high temperature threshold, the third mixture excursion color state visibly distinguishable from the base mixture color state, the low mixture excursion color state, and the high mixture excursion color state.

7. The temperature exposure indicator of claim 6, further comprising:

a first color reference region colored in a first reference color corresponding to the low mixture excursion color state;

a second color reference region colored in a second reference color corresponding to the high mixture excursion color state; and a third color reference region colored in a third reference color corresponding to the third mixture excursion color state.

8. The temperature exposure indicator of claim 1, wherein the mixture further comprises a rheology modifier, a de-foamer, and a resin.

9. The temperature exposure indicator of claim 1, wherein the temperature exposure indicator comprises a thermochromic ink applied to the substrate, the thermochromic ink comprising:

the first thermochromic material;

the second thermochromic material;

a rheology modifier;

a de-foamer;

a resin; and water.

10. The temperature exposure indicator of claim 9, wherein the first thermochromic material is between 10% and 20% of a total weight of the thermochromic ink.

11. The temperature exposure indicator of claim 9, wherein the second thermochromic material is between 10% and 20% of a total weight of the thermochromic ink.

12. The temperature exposure indicator of claim 9, wherein the resin is between 15% and 25% of a total weight of the thermochromic ink.

13. The temperature exposure indicator of claim 9, wherein the de-foamer is selected from a list consisting of Additol XW 6569, Additol WT 102 DF-M, Surfynol DF-58, Airase 5655, Tego Foamex 9, Tego Foamex 852, Tego Foamex 1488, Tego Airex 922.

14. The temperature exposure indicator of claim 1, wherein the first thermochromic material is configured not to return to the first initial color state when the first thermochromic material returns to the base temperature range after changing to the low excursion color state.

15. The temperature exposure indicator of claim 1, wherein the second thermochromic material is configured not to return to the second initial color state when the second thermochromic material returns to the base temperature range after changing to the high excursion color state.

16. An article of manufacture, comprising:

a package; and a temperature exposure indicator on or in the package; the temperature exposure indicator having a mixture of a first thermochromic material and a second thermochromic material, the first thermochromic material having a first initial color state while in a base temperature range and configured to change to a low excursion color state below a low temperature threshold, the second thermochromic material having a second initial color state while in the base temperature range and configured to change to a high excursion color state above a high temperature threshold, and the mixture configured to have a base mixture color state in the base temperature range, a low mixture excursion color state below the low temperature threshold, and a high mixture excursion color state above the high temperature threshold, wherein the mixture is configured to have a third mixture excursion color state when the mixture returns to the base temperature range after having excursions both below the low temperature threshold and above the high temperature threshold, the third mixture excursion color state visibly distinguishable from the base mixture color state, the low mixture excursion color state, and the high mixture excursion color state.

17. The article of manufacture of claim 16, wherein the package contains a perishable host product.

18. The article of manufacture of claim 17, wherein the perishable host product has a predetermined specified exposure time limit for a predetermined low temperature threshold, and the temperature exposure indicator is configured so that the mixture transitions from the base mixture color state to the low mixture excursion color state when exposed to the predetermined low temperature threshold beyond the predetermined specified exposure time limit.

19. The article of manufacture of claim 17, wherein the perishable host product has a predetermined specified exposure time limit for a predetermined high temperature threshold, and the temperature exposure indicator is configured so that the mixture transitions from the base mixture color state to the high mixture excursion color state when exposed to the predetermined high temperature threshold beyond the predetermined specified exposure time limit.

20. A method of producing a temperature exposure indicator, comprising:

mixing components including a first thermochromic material and a second thermochromic material to create a mixture; and applying the mixture to a substrate, producing a temperature exposure indicator including the substrate, and the mixture supported by the substrate;

wherein in the temperature exposure indicator the first thermochromic material has a first initial color state while in a base temperature range and is configured to change to a low excursion color state below a low temperature threshold, the second thermochromic material has a second initial color state while in the base temperature range and is configured to change to a high excursion color state above a high temperature threshold, the mixture is configured to have a base mixture color state in the base temperature range, a low mixture excursion color state below the low temperature threshold, and a high mixture excursion color state above the high temperature threshold, wherein the first initial color state and second initial color state are colorless, white, or transparent, and the high excursion color state and low excursion color states are colored or dark.

21. The method of producing a temperature exposure indicator of claim 20, further comprising the steps of:

after applying the mixture to the substrate, treating the first thermochromic material to cause the first thermochromic material to display the first initial color state.

22. The method of producing a temperature exposure indicator of claim 20, further comprising the steps of:

after applying the mixture to the substrate, treating the second thermochromic material to cause the second thermochromic material to display the second initial color state.

* * * * *